(12) United States Patent
Nakajima et al.

(10) Patent No.: US 10,221,923 B2
(45) Date of Patent: Mar. 5, 2019

(54) MULTI-STAGE TRANSMISSION

(71) Applicant: AISIN AW CO., LTD., Anjo-shi, Aichi-ken (JP)

(72) Inventors: Takuya Nakajima, Toyota (JP); Naoya Jinnai, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 168 days.

(21) Appl. No.: 15/122,813

(22) PCT Filed: Mar. 20, 2015

(86) PCT No.: PCT/JP2015/058457
§ 371 (c)(1),
(2) Date: Aug. 31, 2016

(87) PCT Pub. No.: WO2015/146826
PCT Pub. Date: Oct. 1, 2015

(65) Prior Publication Data
US 2017/0074372 A1     Mar. 16, 2017

(30) Foreign Application Priority Data

Mar. 27, 2014   (JP) ................................. 2014-066151

(51) Int. Cl.
*F16H 57/025*     (2012.01)
*F16H 3/66*       (2006.01)
(Continued)

(52) U.S. Cl.
CPC ............. *F16H 3/663* (2013.01); *F16D 13/52* (2013.01); *F16D 13/683* (2013.01);
(Continued)

(58) Field of Classification Search
CPC .. F16H 3/663; F16H 57/025; F16H 2057/087; F16H 2200/2046;
(Continued)

(56) References Cited

U.S. PATENT DOCUMENTS 4,709,594 A * 12/1987 Maeda ................... F16H 3/666
                                                    475/280
7,582,039 B2 * 9/2009 Iwasaki ................... F16H 3/66
                                                    475/280

(Continued)

FOREIGN PATENT DOCUMENTS

DE    112014004390 T5    6/2016
JP    2008-281188 A      11/2008
JP    2009-103229 A      5/2009

OTHER PUBLICATIONS

Jun. 23, 2015 Search Report issued in International Patent Application No. PCT/JP2015/058457.

Primary Examiner — Roger L Pang
(74) Attorney, Agent, or Firm — Oliff PLC

(57) ABSTRACT

A multi-stage transmission that includes a case including an annular support that extends radially inward from an inner peripheral surface of the case; a first planetary gear mechanism that includes a plurality of rotating elements and to which power is transmitted from the input member; a second planetary gear mechanism that is disposed on an opposite side of the support of the case from the first planetary gear mechanism; a clutch that interconnects any one of the rotating elements of the first planetary gear mechanism with an element to be connected which is included in the second planetary gear mechanism and releases this interconnection; and a brake that connects the element to be connected to the case to hold this element stationary and releases this connection.

17 Claims, 6 Drawing Sheets

(51) Int. Cl.
   *F16D 13/68*      (2006.01)
   *F16D 25/0638*    (2006.01)
   *F16D 13/52*      (2006.01)
   *F16H 57/10*      (2006.01)
   *F16D 1/10*       (2006.01)
   *F16H 57/08*      (2006.01)

(52) U.S. Cl.
   CPC ....... *F16D 25/0638* (2013.01); *F16H 57/025* (2013.01); *F16H 57/10* (2013.01); *F16D 2001/103* (2013.01); *F16D 2300/08* (2013.01); *F16H 2057/087* (2013.01); *F16H 2200/0069* (2013.01); *F16H 2200/201* (2013.01); *F16H 2200/2007* (2013.01); *F16H 2200/2023* (2013.01); *F16H 2200/2046* (2013.01)

(58) Field of Classification Search
   CPC ....... F16H 2200/2023; F16H 2200/201; F16H 2200/0069
   USPC ......................... 475/275–291, 330; 74/606 R
   See application file for complete search history.

(56) References Cited

U.S. PATENT DOCUMENTS

| | | | |
|---|---|---|---|
| 7,927,247 B2* | 4/2011 | Bauknecht | F16H 3/663 475/275 |
| 8,002,660 B2* | 8/2011 | Kato | F16H 57/0037 475/159 |
| 8,096,915 B2 | 1/2012 | Wittkopp et al. | |
| 8,834,310 B2* | 9/2014 | Goleski | F16H 63/3026 192/48.601 |
| 8,870,696 B2* | 10/2014 | Wilton | F16H 3/62 475/138 |
| 9,194,482 B2* | 11/2015 | Goleski | F16H 63/3026 |
| 2008/0280721 A1 | 11/2008 | Seo | |
| 2010/0216591 A1 | 8/2010 | Wittkopp et al. | |
| 2016/0252164 A1 | 9/2016 | Murakami et al. | |
| 2016/0265629 A1* | 9/2016 | Nakajima | F16H 3/663 |
| 2016/0273621 A1* | 9/2016 | Jinnai | F16H 61/0265 |
| 2017/0314650 A1* | 11/2017 | Jinnai | F16H 3/663 |

* cited by examiner

FIG. 3

|  | C1 | C2 | C3 | C4 | B1 | B2 | GEAR RATIO | STEP RATIO |
|---|---|---|---|---|---|---|---|---|
| 1st | O | O | - | - | - | O | 5.091 | 1.581 |
| 2nd | O | - | - | - | O | O | 3.219 | 1.385 |
| 3rd | - | O | - | - | O | O | 2.324 | 1.232 |
| 4th | - | - | - | O | O | O | 1.886 | 1.265 |
| 5th | - | O | - | O | O | - | 1.491 | 1.251 |
| 6th | O | - | - | O | O | - | 1.192 | 1.192 |
| 7th | O | - | O | O | - | - | 1.000 | 1.273 |
| 8th | - | - | O | O | O | - | 0.785 | 1.242 |
| 9th | O | - | O | - | O | - | 0.632 | 1.076 |
| 10th | - | O | O | - | O | - | 0.588 | 0.955 |
| REV. | - | O | O | - | - | O | -4.860 | |
| | ※ "O" : ENGAGED, "-" : DISENGAGED | | | | | | SPREAD | 8.660 |

MULTI-STAGE TRANSMISSION

BACKGROUND

The disclosure of the present disclosure relates to a multi-stage transmission that changes the speed of power transmitted from a motor of a vehicle to an input member to transmit the power to an output member.

Conventionally, a multi-stage transmission of this type has been known which includes two single-pinion type planetary gears, a Ravigneaux type planetary gear mechanism as a compound planetary gear train, four clutches, and two brakes (see U.S. Pat. No. 8,096,915, for example). The Ravigneaux type planetary gear mechanism that is a component of this multi-stage transmission includes an input element (carrier) continuously coupled to an input shaft to which power is transmitted from a motor, a fixable element (front sun gear) that is selectively held stationary by a brake, a first output element (ring gear), and a second output element (rear sun gear). The first output element of the Ravigneaux type planetary gear mechanism is selectively connected via a first clutch (symbol 26) to a sun gear of one planetary gear (symbol 20) of the two planetary gears that is disposed posteriorly in the vehicle so as to be separated apart from the Ravigneaux type planetary gear mechanism. The second output element of the Ravigneaux type planetary gear mechanism that rotates at a higher speed than the first output element when the vehicle travels forward is selectively connected to the sun gear of the one planetary gear via a second clutch (symbol 28). Furthermore, the first output element of the Ravigneaux type planetary gear mechanism is selectively connected to a ring gear of the one planetary gear via a third clutch (symbol 32).

SUMMARY

In the conventional multi-stage transmission described above, between the Ravigneaux type planetary gear mechanism and the one planetary gear that is disposed (posteriorly in the vehicle) so as to be separated apart from the Ravigneaux type planetary gear mechanism, the other planetary gear (symbol 18) is disposed. Thus, in order to connect the first output element (ring gear) of the Ravigneaux type planetary gear mechanism to the ring gear of the one planetary gear, the third clutch needs to be structured so as to detour around the other planetary gear. Furthermore, in this multi-stage transmission, it is necessary to prevent the oil passage structure for supplying engagement oil pressure to the third clutch from becoming complicated and to reduce drag loss due to frictional resistance of a seal member that restricts leakage of hydraulic oil into the third clutch. However, U.S. Pat. No. 8,096,915 described above does not disclose anything on the specific structure of clutches that are components of the multi-stage transmission.

In view of this, an exemplary aspect of the present disclosure further improves oil supply performance of clutches that are components of a multi-stage transmission and to satisfactorily reduce drag loss in the clutches.

A multi-stage transmission of the present disclosure is a multi-stage transmission that changes speed of power transmitted from a motor of a vehicle to an input member to transmit the power to an output member, the multi-stage transmission including: a case including an annular support that extends radially inward from an inner peripheral surface of the case; a first planetary gear mechanism that includes a plurality of rotating elements and to which power is transmitted from the input member; a second planetary gear mechanism that is disposed on an opposite side of the support of the case from the first planetary gear mechanism; a clutch that interconnects any one of the rotating elements of the first planetary gear mechanism with an element to be connected which is included in the second planetary gear mechanism and releases this interconnection; and a brake that connects the element to be connected to the case to hold this element stationary and releases this connection, in which rotation speed of any one of the rotating elements is equal to or higher than rotation speed of the input member when the vehicle travels forward, and an engagement oil chamber of the clutch is defined by a clutch constituent member that rotates together with the element to be connected and a piston that is supported by the clutch constituent member, the clutch constituent member is rotatably supported by an inner peripheral surface of the support via a bearing, hydraulic oil is supplied to the engagement oil chamber from an oil passage formed in the support of the case, and a seal member for blocking the hydraulic oil is disposed between the support and the clutch constituent member.

Specifically, as in the multi-stage transmission of the present disclosure, to the engagement oil chamber of the clutch that is structured to detour around the support of the case, hydraulic oil from the oil passage formed in the support is supplied, whereby engagement oil pressure can be supplied to the clutch without making the oil passage structure complicated. Furthermore, the engagement oil chamber of the clutch is defined by the clutch constituent member and the piston supported by the clutch constituent member, in which the clutch constituent member rotates together, not with any one of the rotating elements that rotates at a rotation speed equal to or higher than the rotation speed of the input member when the vehicle travels forward, but with the element to be connected which is connected to the case by the brake to stop rotating under some conditions. This can satisfactorily reduce drag loss due to frictional resistance of the seal member disposed between the support and the clutch constituent member. Thus, in the multi-stage transmission of the present disclosure, oil supply performance of the clutch can be further improved, and drag loss in the clutch can be satisfactorily reduced.

BRIEF DESCRIPTION OF THE DRAWINGS

FIG. 3 is an operation table illustrating a relation between each shift speed and operating states of clutches and brakes in the multi-stage transmission of the present disclosure.

DETAILED DESCRIPTION OF EMBODIMENTS

Modes for carrying out the disclosure of the present disclosure will now be described with reference to the drawings.

Figure 1:
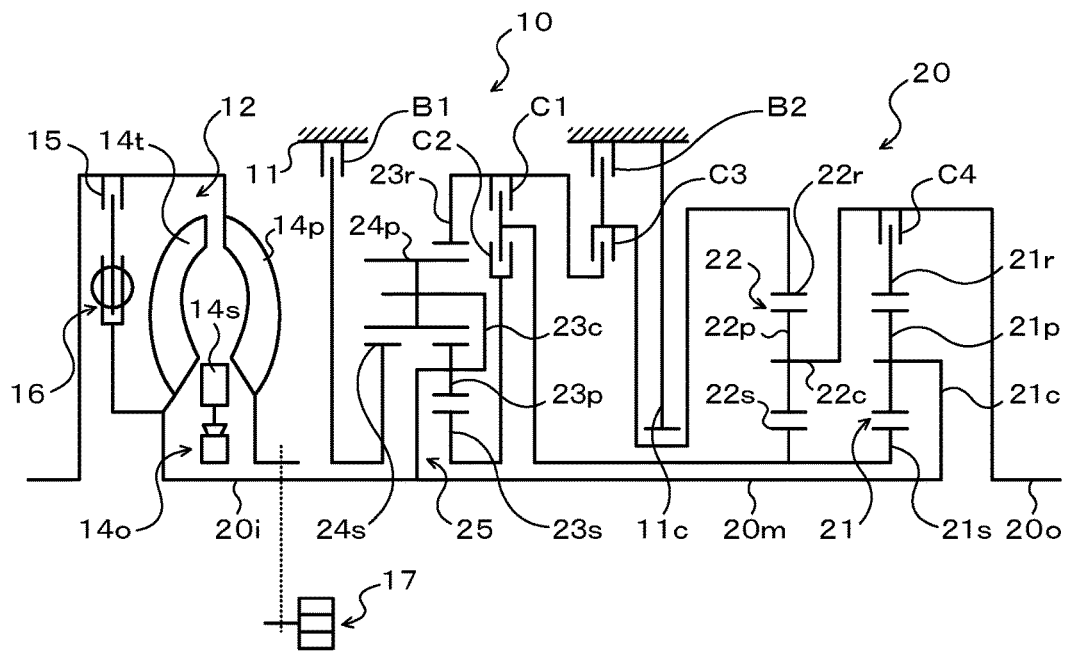
FIG. 1 is a schematic structure diagram illustrating a power transmission apparatus including a multi-stage transmission of the present disclosure.

FIG. 1 is a schematic structure diagram of a power transmission apparatus 10 including an automatic transmission 20 serving as a multi-stage transmission of the present disclosure. The power transmission apparatus 10 shown in FIG. 1 is an apparatus that is connected to a crankshaft of an engine (internal combustion engine) and/or a rotor of an electric motor (not shown) as a drive source that is longitudinally mounted in a front area of a rear-wheel-drive vehicle, and can transmit power (torque) from the engine or other sources to right and left rear wheels (drive wheels) (not shown). As shown in the drawing, the power transmission apparatus 10 includes a transmission case (stationary member) 11 made of an aluminum alloy, for example, a starting device (fluid transmission apparatus) 12, and an oil pump 17, in addition to the automatic transmission 20 that changes the speed of power transmitted from the engine or other sources to an input shaft 20$i$ to transmit the power to an output shaft 20$o$.

The starting device 12 includes a torque converter including: a pump impeller 14$p$ on the input side, which is coupled to a drive source as described above; a turbine runner 14$t$ on the output side, which is coupled to the input shaft (input member) 20$i$ of the automatic transmission 20; a stator 14$s$ that is disposed between the pump impeller 14$p$ and the turbine runner 14$t$ to adjust a flow of hydraulic oil from the turbine runner 14$t$ to the pump impeller 14$p$; and a one-way clutch 14$o$ that is supported by a stator shaft (not shown) to restrict the rotation direction of the stator 14$s$ to one direction. The starting device 12 further includes: a lockup clutch 15 that interconnects a front cover coupled to the crankshaft or other members of the engine with the input shaft 20$i$ of the automatic transmission 20, and releases this interconnection; and a damper mechanism 16 that damps vibrations between the front cover and the input shaft 20$i$ of the automatic transmission 20. Herein, the starting device 12 may include a fluid coupling that does not have the stator 14$s$.

The oil pump 17 is structured as a gear pump including: a pump assembly including a pump body and a pump cover; an external gear (inner rotor) coupled to the pump impeller 14$p$ of the starting device 12 via a chain or a gear train; and an internal gear (outer rotor) meshing with the external gear. The oil pump 17, driven by power from the engine or other sources intakes hydraulic oil (ATF) stored in an oil pan (not shown) and feeds the hydraulic oil into a hydraulic control apparatus (not shown) in a pressurized manner.

The automatic transmission 20 is structured as a 10-speed transmission. As shown in FIG. 1, in addition to the input shaft 20$i$, the automatic transmission 20 includes: the output shaft (output member) 20$o$ coupled to the right and left rear wheels via a differential gear and a drive shaft (not shown); a first planetary gear 21 and a second planetary gear 22 that are of a single-pinion type and are disposed such that the first planetary gear 21 and the second planetary gear 22 are arranged in the axial direction of the automatic transmission 20 (the input shaft 20$i$ and the output shaft 20$o$); and a Ravigneaux type planetary gear mechanism 25 as a compound planetary gear train structured by combining a double-pinion type planetary gear and a single-pinion type planetary gear. The automatic transmission 20 further includes a clutch C1 (first clutch) as a first engagement element, a clutch C2 (second clutch) as a second engagement element, a clutch C3 (third clutch) as a third engagement element, a clutch C4 (fourth clutch) as a fourth engagement element, a brake B1 (first brake) as a fifth engagement element, and a brake B2 (second brake) as a sixth engagement element that are configured to change power transfer paths from the input shaft 20$i$ to the output shaft 20$o$.

In the present embodiment, the first and the second planetary gears 21 and 22 and the Ravigneaux type planetary gear mechanism 25 are disposed in the transmission case 11 such that the Ravigneaux type planetary gear mechanism 25, the second planetary gear 22, and the first planetary gear 21 are arranged in this order from the starting device 12, or the engine side (left side in FIG. 1). More specifically, the single-pinion type planetary gear that is a component of the Ravigneaux type planetary gear mechanism 25, the double-pinion type planetary gear that is a component of the Ravigneaux type planetary gear mechanism 25, the second planetary gear 22, and the first planetary gear 21 are arranged in this order. Consequently, the Ravigneaux type planetary gear mechanism 25 is disposed anteriorly in a vehicle so as to be positioned close to the starting device 12. The first planetary gear 21 is disposed posteriorly in the vehicle so as to be positioned close to the output shaft 20$o$. Furthermore, the second planetary gear 22 is disposed between the Ravigneaux type planetary gear mechanism 25 and the first planetary gear 21.

The first planetary gear 21 includes a first sun gear 21$s$ that is an external gear, a first ring gear 21$r$ that is an internal gear disposed concentrically with the first sun gear 21$s$, a plurality of first pinion gears 21$p$ each meshing with the first sun gear 21$s$ and the first ring gear 21$r$, and a first carrier 21$c$ rotatably (turnably) and revolvably holding the first pinion gears 21$p$. In the present embodiment, the gear ratio $\lambda 1$ of the first planetary gear 21 (the number of teeth of the first sun gear 21$s$/the number of teeth of the first ring gear 21$r$) is determined to be $\lambda 1 = 0.277$, for example.

As shown in FIG. 1, the first carrier 21$c$ of the first planetary gear 21 is continuously coupled (fixed) to an intermediate shaft 20$m$ of the automatic transmission 20 coupled to the input shaft 20$i$. Consequently, when power is transmitted from the engine or other sources to the input shaft 20$i$, the power from the engine or other sources is continuously transmitted to the first carrier 21$c$ via the input shaft 20$i$ and the intermediate shaft 20$m$. The first carrier 21$c$ functions as an input element (first input element of the automatic transmission 20) of the first planetary gear 21 during engagement of the clutch C4, and idles during disengagement of the clutch C4. The first ring gear 21$r$ functions as an output element (first output element of the automatic transmission 20) of the first planetary gear 21 during engagement of the clutch C4.

The second planetary gear 22 includes a second sun gear 22$s$ that is an external gear, a second ring gear 22$r$ that is an internal gear disposed concentrically with the second sun gear 22$s$, a plurality of second pinion gears 22$p$ each meshing with the second sun gear 22$s$ and the second ring gear 22$r$, and a second carrier (planetary carrier) 22$c$ rotatably (turnably) and revolvably holding the second pinion gears 22$p$. In the present embodiment, the gear ratio $\lambda 2$ (the number of teeth of the second sun gear 22$s$/the number of teeth of the second ring gear 22$r$) of the second planetary gear 22 is determined to be $\lambda 2 = 0.244$, for example.

As shown in FIG. 1, the second sun gear 22$s$ of the second planetary gear 22 is integrated (continuously coupled) with the first sun gear 21$s$ of the first planetary gear 21, and rotates or stops continuously together (and coaxially) with the first sun gear 21$s$. Herein, the first sun gear 21$s$ and the second sun gear 22$s$ may be separately configured and continuously coupled together via a coupling member (first coupling member) (not shown). The second carrier 22$c$ of the second planetary gear 22 is continuously coupled to the output shaft 20o, and rotates or stops continuously together (and coaxially) with the output shaft 20o. Accordingly, the second carrier 22c functions as an output element (second output element of the automatic transmission 20) of the second planetary gear 22. Furthermore, the second ring gear 22r of the second planetary gear 22 functions as a fixable element (first fixable element of the automatic transmission 20) of the second planetary gear 22.

The Ravigneaux type planetary gear mechanism 25 includes: a third sun gear 23s and a fourth sun gear 24s that are external gears; a third ring gear 23r that is an internal gear disposed concentrically with the third sun gear 23s; a plurality of third pinion gears (short pinion gears) 23p meshing with the third sun gear 23s; a plurality of fourth pinion gears (long pinion gears) 24p meshing with the fourth sun gear 24s and the third pinion gears 23p and also meshing with the third ring gear 23r; and a third carrier 23c rotatably (turnably) and revolvably holding the third pinion gears 23p and the fourth pinion gears 24p.

This Ravigneaux type planetary gear mechanism 25 is a compound planetary gear train structured by combining the double-pinion type planetary gear (third planetary gear) and the single-pinion type planetary gear (fourth planetary gear). In other words, the third sun gear 23s, the third carrier 23c, the third and the fourth pinion gears 23p and 24p, and the third ring gear 23r of the Ravigneaux type planetary gear mechanism 25 constitute the third planetary gear of a double-pinion type. The fourth sun gear 24s, the third carrier 23c, the fourth pinion gears 24p, and the third ring gear 23r of the Ravigneaux type planetary gear mechanism 25 constitute the fourth planetary gear of the single-pinion type. In the present embodiment, the Ravigneaux type planetary gear mechanism 25 is structured such that the gear ratio $\lambda 3$ (the number of teeth of the third sun gear 23s/the number of teeth of the third ring gear 23r) of the third planetary gear of the double-pinion type is $\lambda 3 = 0.488$, for example, and the gear ratio $\lambda 4$ (the number of teeth of the fourth sun gear 24s/the number of teeth of the third ring gear 23r) of the fourth planetary gear of the single-pinion type is $\lambda 4 = 0.581$, for example.

Out of rotating elements constituting the Ravigneaux type planetary gear mechanism 25 (third and fourth planetary gears), the fourth sun gear 24s functions as a fixable element (second fixable element of the automatic transmission 20) of the Ravigneaux type planetary gear mechanism 25. Furthermore, as shown in FIG. 1, the third carrier 23c is continuously coupled (fixed) to the input shaft 20i, and also continuously coupled to the first carrier 21c of the first planetary gear 21 via the intermediate shaft 20m as a coupling member (second coupling member). Consequently, when power is transmitted from the engine or other sources to the input shaft 20i, the power from the engine or other sources is continuously transmitted to the third carrier 23c via the input shaft 20i. Thus, the third carrier 23c functions as an input element (second input element of the automatic transmission 20) of the Ravigneaux type planetary gear mechanism 25. The third ring gear 23r functions as a first output element of the Ravigneaux type planetary gear mechanism 25, and the third sun gear 23s functions as a second output element of the Ravigneaux type planetary gear mechanism 25.

The clutch C1 interconnects the third ring gear 23r that is the first output element of the Ravigneaux type planetary gear mechanism 25 with the first sun gear 21s of the first planetary gear 21 and the second sun gear 22s of the second planetary gear 22 that are continuously coupled together and releases this interconnection. The clutch C2 interconnects the third sun gear 23s that is the second output element of the Ravigneaux type planetary gear mechanism 25 with the first sun gear 21s of the first planetary gear 21 and the second sun gear 22s of the second planetary gear 22 that are continuously coupled together and releases this interconnection. The clutch C3 interconnects the second ring gear 22r of the second planetary gear 22 with the third ring gear 23r that is the first output element of the Ravigneaux type planetary gear mechanism 25 and releases this interconnection. The clutch C4 interconnects the first ring gear 21r that is the output element of the first planetary gear 21 with the output shaft 20o and releases this interconnection.

The brake B1 holds (connects) the fourth sun gear 24s that is a fixable element of the Ravigneaux type planetary gear mechanism 25 stationary with respect to the transmission case 11 as a stationary member, and also rotatably releases the fourth sun gear 24s from the transmission case 11. The brake B2 holds (connects) the second ring gear 22r that is a fixable element of the second planetary gear 22 stationary with respect to the transmission case 11, and also rotatably releases the second ring gear 22r from the transmission case 11 as a stationary member.

In the present embodiment, as the clutches C1 to C4, multi-plate friction type hydraulic clutches (friction engagement elements) are used each including: a piston; a plurality of friction engagement plates (e.g., friction plates each structured with an annular member on both sides of which friction material is bonded, and separator plates that are each an annular member both sides of which are smoothly formed); and a hydraulic servo including an engagement oil chamber and a centrifugal oil pressure cancel chamber to each of which hydraulic oil is supplied. As brakes B1 and B2, multi-plate friction type hydraulic brakes are used each including: a piston; a plurality of friction engagement plates (friction plates and separator plates); and a hydraulic servo including an engagement oil chamber to which hydraulic oil is supplied. The clutches C1 to C4 and the brakes B1 and B2 operate with hydraulic oil supplied and discharged by the hydraulic control apparatus.

Figure 2:
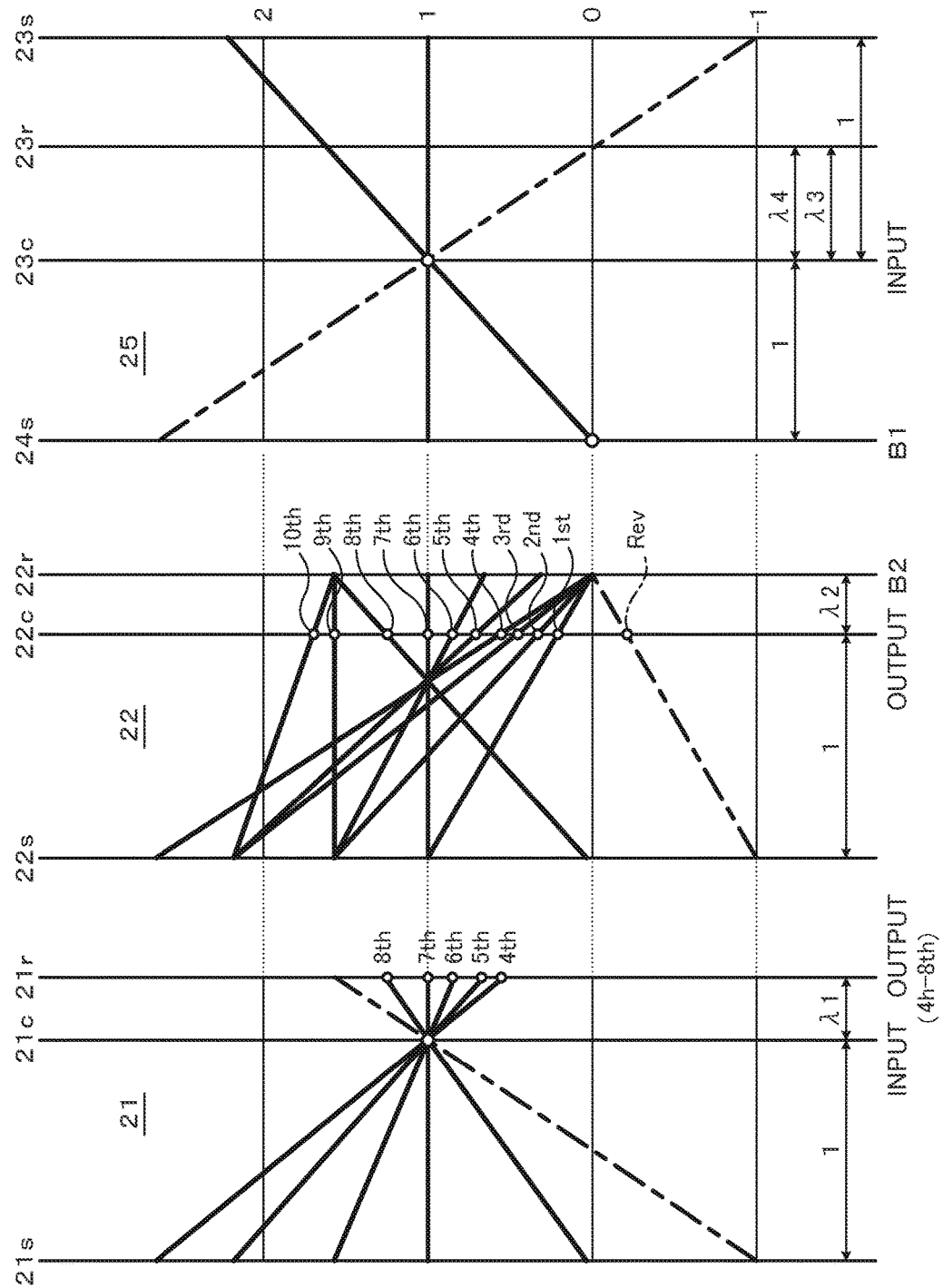
FIG. 2 is a speed diagram illustrating the ratio of the rotation speed of each rotating element to the input rotation speed in the multi-stage transmission of the present disclosure.

FIG. 2 is a speed diagram illustrating the ratio of the rotation speed of each rotating element to the rotation speed (input rotation speed) of the input shaft 20i in the automatic transmission 20 (herein, the rotation speed of the input shaft 20i, i.e., the first carrier 21c and the third carrier 23c is assumed to be a value of 1). FIG. 3 is an operation table illustrating a relation between each shift speed and operating states of the clutches C1 to C4 and the brakes B1 and B2 in the automatic transmission 20.

As shown in FIG. 2, three rotating elements constituting the first planetary gear 21 of the single-pinion type, i.e., the first sun gear 21s, the first ring gear 21r, and the first carrier 21c are arranged, on the speed diagram of the first planetary gear 21 (speed diagram in the left of FIG. 2), in the order of the first sun gear 21s, the first carrier 21c, and the first ring gear 21r from the left in the drawing at intervals corresponding to the gear ratio $\lambda 1$. In accordance with the arrangement order of this speed diagram, in the present disclosure, the first sun gear 21s is the first rotating element of the automatic transmission 20, the first carrier 21c is the second rotating element of the automatic transmission 20, and the first ring gear 21r is the third rotating element of the automatic transmission 20. Thus, the first planetary gear 21 includes the first rotating element, the second rotating element, and the third rotating element of the automatic transmission 20 that are arranged in order at intervals corresponding to the gear ratio $\lambda 1$ on the speed diagram.

Three rotating elements constituting the second planetary gear 22 of the single-pinion type, i.e., the second sun gear 22s, the second ring gear 22r, and the second carrier 22c are arranged, on the speed diagram of the second planetary gear 22 (speed diagram in the center of FIG. 2), in the order of the second sun gear 22s, the second carrier 22c, and the second ring gear 22r from the left in the drawing at intervals corresponding to the gear ratio λ2. In accordance with the arrangement order of this speed diagram, in the present disclosure, the second sun gear 22s is the fourth rotating element of the automatic transmission 20, the second carrier 22c is the fifth rotating element of the automatic transmission 20, and the second ring gear 22r is the sixth rotating element of the automatic transmission 20. Thus, the second planetary gear 22 includes the fourth rotating element, the fifth rotating element, and the sixth rotating element of the automatic transmission 20 that are arranged in order at intervals corresponding to the gear ratio λ2 on the speed diagram.

Furthermore, four rotating elements constituting the Ravigneaux type planetary gear mechanism 25, i.e., the fourth sun gear 24s as the fixable element, the third carrier 23c as the input element, the third ring gear 23r as the first output element, and the third sun gear 23s as the second output element are arranged in this order from the left in the drawing at intervals corresponding to the gear ratio λ3 of the third planetary gear of the double-pinion type and the gear ratio λ4 of the fourth planetary gear of the single-pinion type on the speed diagram of the Ravigneaux type planetary gear mechanism 25 (speed diagram in the right of FIG. 2). In accordance with the arrangement order of this speed diagram, in the present disclosure, the fourth sun gear 24s is the seventh rotating element of the automatic transmission 20, the third carrier 23c is the eighth rotating element of the automatic transmission 20, the third ring gear 23r is the ninth rotating element of the automatic transmission 20, and the third sun gear 23s is the tenth rotating element of the automatic transmission 20. Thus, the Ravigneaux type planetary gear mechanism 25 includes the seventh rotating element, the eighth rotating element, the ninth rotating element, and the tenth rotating element of the automatic transmission 20 that are arranged in order at intervals corresponding to the gear ratios λ3 and λ4 on the speed diagram.

In the automatic transmission 20, as shown in FIG. 3, the clutches C1 to C4 and the brakes B1 and B2 are engaged or disengaged to change the connection relation of the first to the tenth rotating elements (which are substantially nine rotating elements in total because the first rotating element and the fourth rotating element are continuously coupled together), whereby ten power transfer paths in the forward rotation direction and one power transfer path in the reverse rotation direction, i.e., the first to the tenth forward speeds and the reverse speed can be set between the input shaft 20i and the output shaft 20o.

Specifically, the first forward speed is formed by engaging the clutches C1 and C2 and the brake B2, and disengaging the remaining clutches C3 and C4 and the brake B1. More specifically, when the first forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. Furthermore, the second ring gear 22r (fixable element) of the second planetary gear 22 is held stationary with respect to the transmission case 11 by the brake B2. In the present embodiment (when the gear ratios of the first and the second planetary gears 21 and 22 and the third and the fourth planetary gears are λ1=0.277, λ2=0.244, λ3=0.488, λ4=0.581, respectively, the same applies hereinafter), the gear ratio (rotation speed of the input shaft 20i/rotation speed of the output shaft 20o) γ1 in the first forward speed is γ1=5.091. When the vehicle travels forward while the fourth sun gear 24s is rotatably released by the brake B1, the third carrier 23c, the third sun gear 23s, the third ring gear 23r, and the fourth sun gear 24s of the Ravigneaux type planetary gear mechanism 25 rotate together at the same rotation speed as shown in FIG. 2.

The second forward speed is formed by engaging the clutch C1 and the brakes B1 and B2, and disengaging the remaining clutches C2, C3, and C4. Specifically, when the second forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. Furthermore, the fourth sun gear 24s (fixable element) of the Ravigneaux type planetary gear mechanism 25 is held stationary with respect to the transmission case 11 by the brake B1. Furthermore, the second ring gear 22r (fixable element) of the second planetary gear 22 is held stationary with respect to the transmission case 11 by the brake B2. In the present embodiment, the gear ratio γ2 in the second forward speed is γ2=3.219. The step ratio between the first forward speed and the second forward speed is γ1/γ2=1.581.

The third forward speed is formed by engaging the clutch C2 and the brakes B1 and B2, and disengaging the remaining clutches C1, C3, and C4. Specifically, when the third forward speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The fourth sun gear 24s (fixable element) of the Ravigneaux type planetary gear mechanism 25 is held stationary with respect to the transmission case 11 by the brake B1. Furthermore, the second ring gear 22r (fixable element) of the second planetary gear 22 is held stationary with respect to the transmission case 11 by the brake B2. In the present embodiment, the gear ratio γ3 in the third forward speed is γ3=2.324. The step ratio between the second forward speed and the third forward speed is γ2/γ3=1.385.

The forward fourth speed is formed by engaging the clutch C4 and the brakes B1 and B2, and disengaging the remaining clutches C1, C2, and C3. Specifically, when the fourth forward speed is formed, the first ring gear 21r (output element) of the first planetary gear 21 is interconnected with the output shaft 20o by the clutch C4. The fourth sun gear 24s (fixable element) of the Ravigneaux type planetary gear mechanism 25 is held stationary with respect to the transmission case 11 by the brake B1. Furthermore, the second ring gear 22r (fixable element) of the second planetary gear 22 is held stationary with respect to the transmission case 11 by the brake B2. In the present embodiment, the gear ratio γ4 in the fourth forward speed is γ4=1.886. The step ratio between the third forward speed and the fourth forward speed is γ3/γ4=1.232.

The fifth forward speed is formed by engaging the clutches C2 and C4 and the brake B1, and disengaging the remaining clutches C1 and C3 and the brake B2. Specifically, when the fifth forward speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio γ5 in the fifth forward speed is γ5=1.491. The step ratio between the fourth forward speed and the fifth forward speed is γ4/γ5=1.265.

The sixth forward speed is formed by engaging the clutches C1 and C4 and the brake B1, and disengaging the remaining clutches C2 and C3 and the brake B2. Specifically, when the sixth forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio γ6 in the sixth forward speed is γ6=1.192. The step ratio between the fifth forward speed and the sixth forward speed is γ5/γ6=1.251.

The seventh forward speed is formed by engaging the clutches C1, C3, and C4, and disengaging the remaining clutch C2 and the brakes B1 and B2. Specifically, when the seventh forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The second ring gear 22r of the second planetary gear 22 is interconnected with the third ring gear 23r (first output element) of the Ravigneaux type planetary gear mechanism 25 by the clutch C3. Furthermore, the first ring gear 21r (output element) of the first planetary gear 21 is interconnected with the output shaft 20o by the clutch C4. In the present embodiment, the gear ratio γ7 in the seventh forward speed is γ7=1.000. The step ratio between the sixth forward speed and the seventh forward speed is γ6/γ7=1.192.

The eighth forward speed is formed by engaging the clutches C3 and C4 and the brake B1, and disengaging the remaining clutches C1 and C2 and the brake B2. Specifically, when the eighth forward speed is formed, the second ring gear 22r of the second planetary gear 22 is interconnected with the third ring gear 23r (first output element) of the Ravigneaux type planetary gear mechanism 25 by the clutch C3. The first ring gear 21r (output element) of the first planetary gear 21 is interconnected with the output shaft 20o by the clutch C4. Furthermore, the fourth sun gear 24s (fixable element) of the Ravigneaux type planetary gear mechanism 25 is held stationary with respect to the transmission case 11 by the brake B1. In the present embodiment, the gear ratio γ8 in the eighth forward speed is γ8=0.785. The step ratio between the seventh forward speed and the eighth forward speed is γ7/γ8=1.273.

The ninth forward speed is formed by engaging the clutches C1 and C3 and the brake B1, and disengaging the remaining clutches C2 and C4 and the brake B2. Specifically, when the ninth forward speed is formed, the first sun gear 21s of the first planetary gear 21 and the second sun gear 22s of the second planetary gear 22 are interconnected with the third ring gear 23r (first output element) of the Ravigneaux type planetary gear mechanism 25 by the clutch C1. The second ring gear 22r of the second planetary gear 22 is interconnected with the third ring gear 23r (first output element) of the Ravigneaux type planetary gear mechanism 25 by the clutch C3. Furthermore, the fourth sun gear 24s (fixable element) of the Ravigneaux type planetary gear mechanism 25 is held stationary with respect to the transmission case 11 by the brake B1. In the present embodiment, the gear ratio γ9 in the ninth forward speed is γ9=0.632. The step ratio between the eighth forward speed and the ninth forward speed is γ8/γ9=1.242.

The tenth forward speed is formed by engaging the clutches C2 and C3 and the brake B1, and disengaging the remaining clutches C1 and C4 and the brake B2. Specifically, when the tenth forward speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The second ring gear 22r of the second planetary gear 22 is interconnected with the third ring gear 23r (first output element) of the Ravigneaux type planetary gear mechanism 25 by the clutch C3. Furthermore, the fourth sun gear 24s (fixable element) of the Ravigneaux type planetary gear mechanism 25 is held stationary with respect to the transmission case 11 by the brake B1. In the present embodiment, the gear ratio γ10 in the tenth forward speed is γ10=0.588. The step ratio between the ninth forward speed and the tenth forward speed is γ9/γ10=1.076. The spread (gear ratio width=the gear ratio γ1 of the first forward speed being the minimum shift speed/the gear ratio γ10 of the tenth forward speed being the maximum shift speed) in the automatic transmission 20 is γ1/γ10=8.660.

The reverse speed is formed by engaging the clutches C2 and C3 and the brake B2, and disengaging the remaining clutches C1 and C4 and the brake B1. Specifically, when the reverse speed is formed, the first sun gear 21s of the first planetary gear 21 and the second sun gear 22s of the second planetary gear 22 are interconnected with the third sun gear 23s (second output element) of the Ravigneaux type planetary gear mechanism 25 by the clutch C2. The second ring gear 22r of the second planetary gear 22 is interconnected with the third ring gear 23r (first output element) of the Ravigneaux type planetary gear mechanism 25 by the clutch C3. Furthermore, the second ring gear 22r (fixable element) of the second planetary gear 22 is held stationary with respect to the transmission case 11 by the brake B2. In the present embodiment, the gear ratio γrev in the reverse speed is γrev=−4.860. The step ratio between the first forward speed and the reverse speed is |γrev/γ1|=0.955.

As described above, the automatic transmission 20 can provide the forward speeds from the first speed to the tenth speed and the reverse speed by engaging and disengaging the clutches C1 to C4 and the brakes B1 and B2. Consequently, in the automatic transmission 20, the spread can be increased (8.660 in the present embodiment) to improve fuel efficiency of the vehicle especially at a high vehicle speed and acceleration performance at each shift speed. Furthermore, the step ratio can be optimized (suppressed further increase) to improve shift feeling. Thus, the automatic transmission 20 can satisfactorily improve both fuel efficiency and drivability of the vehicle.

In the automatic transmission 20, by engaging any three engagement elements and disengaging the remaining three engagement elements out of six engagement elements, i.e., the clutches C1 to C4 and the brakes B1 and B2, the first forward speed to the tenth forward speed and the reverse speed are formed. This can reduce the number of engagement elements that are disengaged when each shift speed is formed in comparison with a transmission that, for example, engages two engagement elements and disengages the remaining four engagement elements out of six engagement elements of clutches and brakes to form a plurality of shift speeds. Consequently, drag loss caused by slight contact between members in the engagement elements that are disengaged when each shift speed is formed can be reduced, whereby the power transfer efficiency of the automatic transmission 20 can be further improved.

Furthermore, in the automatic transmission 20, in the same manner as in the case of the third carrier 23c (input element) of the Ravigneaux type planetary gear mechanism 25, the first carrier 21c (second rotating element) of the first planetary gear 21 is continuously coupled to the input shaft 20i via the intermediate shaft 20m. When the fourth forward speed to the eighth forward speed are formed, the first ring gear 21r (third rotating element) of the first planetary gear 21 is connected to the output shaft 20o (second carrier 22c of the second planetary gear 22) by the clutch C4. This can reduce the torque share of the clutch C4 in comparison with, for example, a clutch of a transmission in which a first ring gear (third rotating element) of a first planetary gear together with a second carrier (fifth rotating element) of a second planetary gear is continuously coupled to an output shaft, and a first carrier (second rotating element) of the first planetary gear is selectively connected to an input shaft, and the clutch selectively connects the first carrier (second rotating element) to the input shaft.

Specifically, in the automatic transmission 20, the first carrier 21c of the first planetary gear 21 is the second rotating element that is continuously coupled to the input shaft 20i, and the first ring gear 21r of the first planetary gear 21 is the third rotating element that is selectively connected to the output shaft 20o by the clutch C4. This can reduce torque transmitted through the engaged clutch C4 down to $1/(1+\lambda 1)$ in comparison with, for example, the clutch that selectively connects the first carrier to the input shaft in the transmission in which the first ring gear of the first planetary gear together with the second carrier of the second planetary gear 22 is continuously coupled to the output shaft, and the first carrier of the first planetary gear is selectively connected to the input shaft. Thus, in the automatic transmission 20, the torque share of the clutch C4 can be satisfactorily reduced, so that the clutch C4 can be made compact in at least either one of the axial direction and the radial direction in the automatic transmission 20. Consequently, with the automatic transmission 20, both power transfer efficiency and drivability can be improved, and also the increase in size of the entire apparatus can be suppressed.

Single-pinion type planetary gears are used herein for the first and the second planetary gears 21 and 22. This can reduce gear loss between rotating elements in the first and the second planetary gears 21 and 22 to further improve the power transfer efficiency of the automatic transmission 20 in comparison with a case in which a double-pinion type planetary gear is used for at least either one of the first and the second planetary gears 21 and 22. Furthermore, it is possible to facilitate assembly and suppress the increase in the weight of the entire apparatus with a reduced number of components. As in the automatic transmission 20, using the Ravigneaux type planetary gear mechanism 25 that is a compound planetary gear train structured with a combination of the third planetary gear of the double-pinion type and the fourth planetary gear of the single-pinion type can facilitate assembly and suppress the increase in the weight of the entire apparatus with a reduced number of components.

The following describes a specific structure of the automatic transmission 20 in detail.

Figure 4:
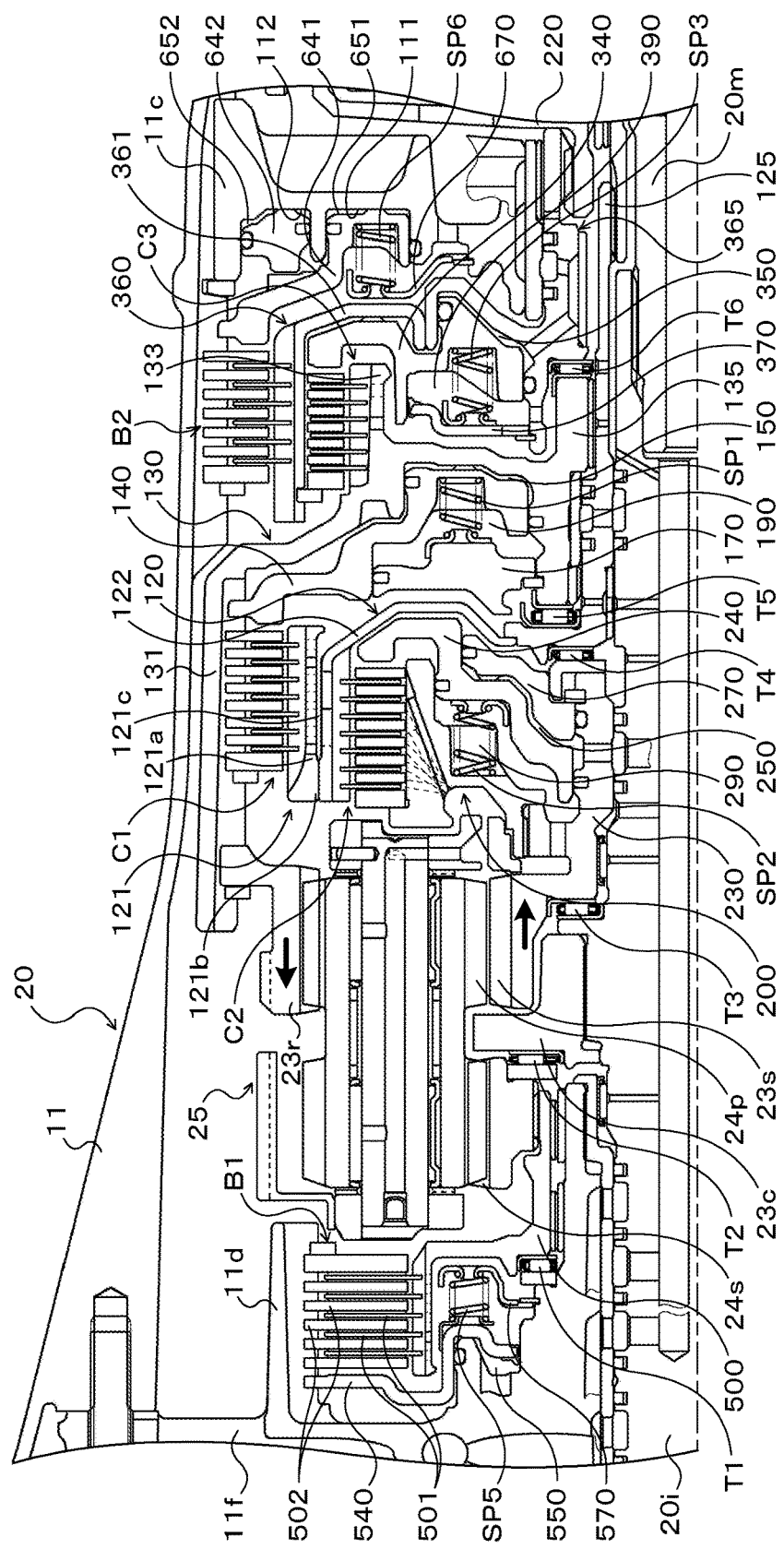
FIG. 4 is an enlarged sectional view illustrating the multi-stage transmission of the present disclosure.
Figure 5:
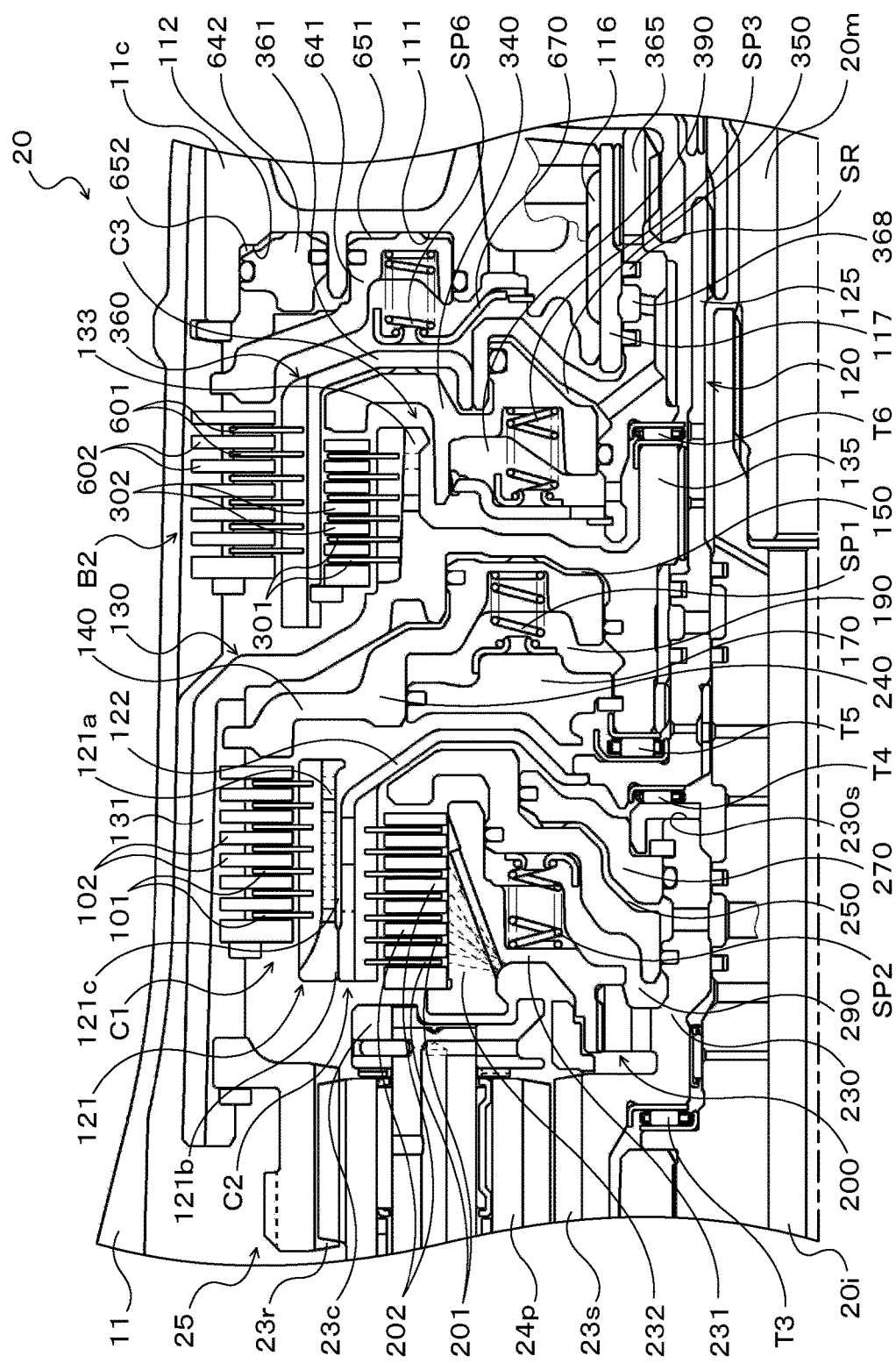
FIG. 5 is an enlarged sectional view illustrating the multi-stage transmission of the present disclosure.
Figure 6:
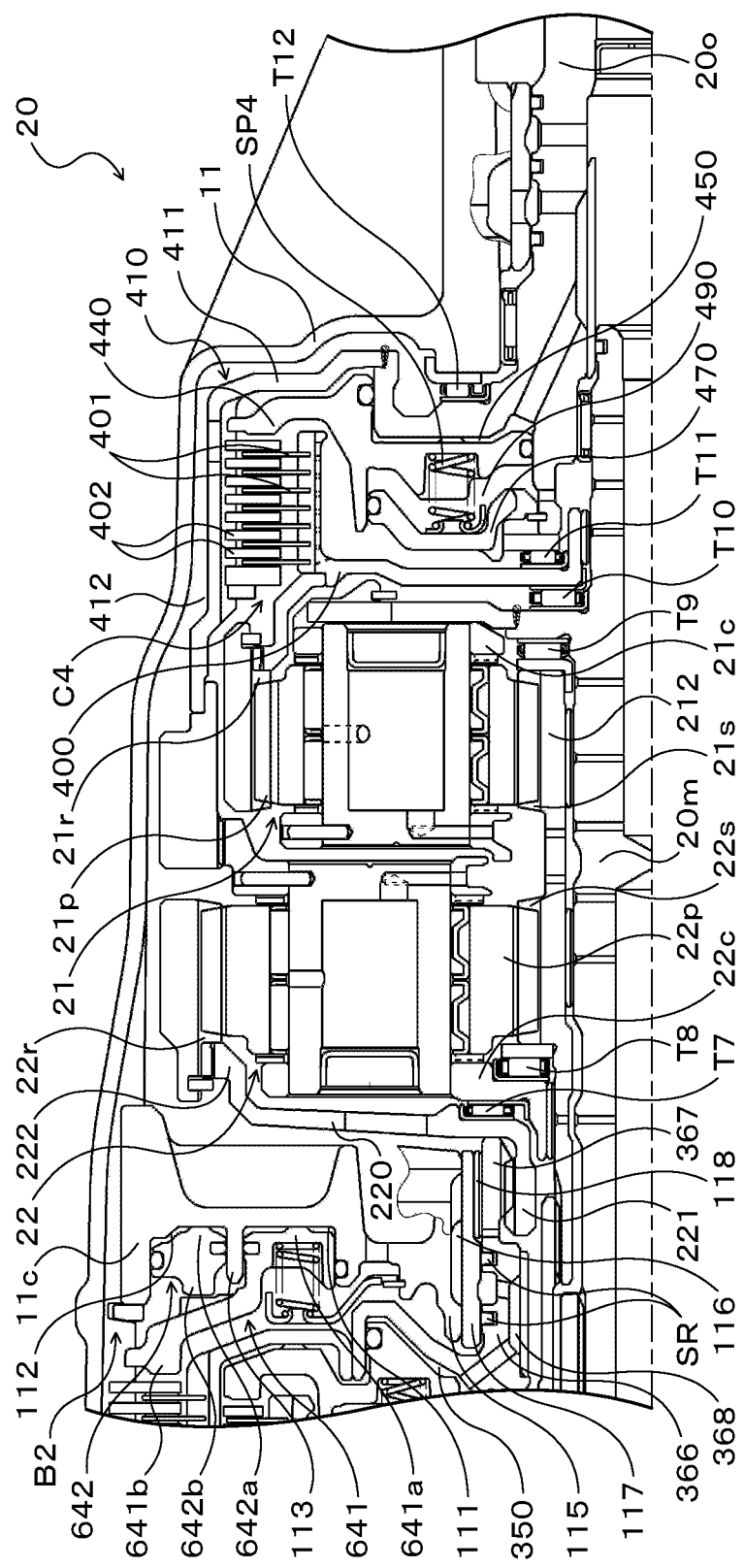
FIG. 6 is an enlarged sectional view illustrating the multi-stage transmission of the present disclosure.

FIG. 4 to FIG. 6 are enlarged sectional views illustrating the automatic transmission 20. As shown in FIG. 1 and FIG. 4, the brake B1 that holds (connects) the fourth sun gear 24s serving as a fixable element of the Ravigneaux type planetary gear mechanism 25 stationary with respect to the transmission case 11 is disposed closest to the starting device 12 (engine) among the four clutches C1 to C4 and the two brakes B1 and B2. Specifically, the brake B1 is disposed on the opposite side of the Ravigneaux type planetary gear mechanism 25 from the first and the second planetary gears 21 and 22, i.e., anteriorly to the Ravigneaux type planetary gear mechanism 25 in the vehicle (on the left side in FIG. 1).

As shown in FIG. 4, the brake B1 includes: a brake hub 500 continuously coupled (fixed) to the fourth sun gear 24s; a plurality of friction plates 501; a plurality of separator plates 502 arranged alternately with the friction plates 501, and a backing plate; a piston 540 that presses the friction plates 501 and the separator plates 502 to cause these plates to frictionally engage with each other; and a plurality of return springs (coil springs) SP5 that bias the piston 540 such that the piston 540 moves away from the friction plates 501 and the separator plates 502.

The brake hub 500 is rotatably supported via a plurality of radial bearings by an annular front support (front support portion) 11f made of aluminum alloy, for example, that is fixed to the transmission case 11 and constitutes part of the transmission case 11. Between the front support 11f and the brake hub 500, a thrust bearing T1 is disposed. Between the fourth sun gear 24s that is continuously coupled to the brake hub 500 and the third carrier 23c of the Ravigneaux type planetary gear mechanism 25, a thrust bearing T2 is disposed. The friction plates 501 (the respective inner peripheral portions thereof) of the brake B1 are fitted into splines formed on an outer peripheral surface of the brake hub 500. Accordingly, the respective friction plates 501 are supported by the brake hub 500 so as to rotate together with the brake hub 500 and be axially movable. The separator plates 502 (the respective outer peripheral portions thereof) of the brake B1 are fitted into splines formed on an inner peripheral surface of a drum portion (tubular portion) 11d extending from the front support 11f in the axial direction of the input shaft 20i. Accordingly, the separator plates 502 are supported by the front support 11f so as not to be rotatable with respect to the transmission case 11 and so as to be axially movable.

Furthermore, the piston 540 is supported by the front support 11f so as not to be rotatable with respect to the transmission case 11 and so as to be axially movable, and together with the front support 11f defines an engagement oil chamber 550 of the brake B1. To the engagement oil chamber 550, engagement oil pressure (hydraulic oil) to the brake B1, which is adjusted by the hydraulic control apparatus, is supplied through oil passages formed in the front support 11f. The return springs SP5 are arranged at intervals in the circumferential direction between the piston 540 and an annular spring support member 570, and are opposed to the engagement oil chamber 550. The spring support member 570 is fixed to the front support 11f by a snap ring so as to be positioned on the opposite side of the piston 540 from the engagement oil chamber 550. As the return springs SP5 of the brake B1, a single leaf spring may be used instead of the coil springs.

As shown in FIG. 1 and FIG. 4, the clutch C1 is disposed between the second planetary gear 22 and the Ravigneaux type planetary gear mechanism 25 so as to be positioned close to the Ravigneaux type planetary gear mechanism 25 (third planetary gear). The clutch C2 is disposed between the second planetary gear 22 and the Ravigneaux type planetary gear mechanism 25 so as to be at least partially surrounded by constituent members of the clutch C1 and be positioned close to the Ravigneaux type planetary gear mechanism 25 (third planetary gear). Furthermore, the clutch C3 is disposed between the second planetary gear 22 and the Ravigneaux type planetary gear mechanism 25 so as to be positioned close to the second planetary gear 22. The brake B2 is disposed between the second planetary gear 22 and the Ravigneaux type planetary gear mechanism 25 so as to at least partially surround the clutch C3 and be positioned close to the second planetary gear 22.

As described above, for the clutches C1 and C2, the first sun gear 21s of the first planetary gear 21 and the second sun gear 22s of the second planetary gear 22 are common elements to be connected. Accordingly, as shown in FIG. 4 and FIG. 5, the clutches C1 and C2 share a drum member 120 that is continuously coupled (fixed) to the first sun gear 21s and the second sun gear 22s of the second planetary gear 22 and functions as a clutch hub of the clutch C1 and a clutch drum of the clutch C2. As described above, for the clutches C1 and C3, the third ring gear 23r of the Ravigneaux type planetary gear mechanism 25 is a common element to be connected. Accordingly, the clutches C1 and C3 share a drum member 130 that is continuously coupled (fixed) to the third ring gear 23r and functions as a clutch drum of the clutch C1 and a clutch hub of the clutch C3. Furthermore, as described above, for the clutch C3 and the brake B2, the second ring gear 22r of the second planetary gear 22 is an element to be connected or an element to be held stationary. Accordingly, the clutch C3 and the brake B2 share a drum member 360 that functions as a clutch drum of the clutch C3 and a brake hub of the brake B2.

The drum member 120 has a hub portion 121 used by the clutch C1, a drum portion 122 used by the clutch C2, and a coupling portion 125 that is continuously coupled (fixed) to the first sun gear 21s of the first planetary gear 21 and the second sun gear 22s of the second planetary gear 22 as the elements to be connected by the clutches C1 and the C2. The hub portion 121 has a hub body 121a including splines formed on the outer peripheral surface thereof and an annular flange portion 121b extending radially inward from one end (left end in FIG. 4 and FIG. 5) of the hub body 121a. In the present embodiment, the inner peripheral surface of the hub body 121a is formed in a shape of a recessed cylindrical surface without protrusions or indentations. This can secure the strength of the hub portion 121 without increasing the thickness of the hub body 121a. Herein, the length of the flange portion 121b in the radial direction is optionally determined based on the torque capacity required of the clutches C1 and C2.

The drum portion 122 is formed in a shape of a bottomed cylinder one end of which (left end in FIG. 4 and FIG. 5) is open, and has a cylindrical portion and an annular sidewall portion extending radially inward from one end (on the right side in FIG. 4 and FIG. 5) of the cylindrical portion. On the inner peripheral surface of the drum portion 122 (cylindrical portion), splines are formed, and the outer peripheral surface of the drum portion 122 (cylindrical portion) is formed in a shape of a cylinder without protrusions or indentations. This can secure the strength of the drum portion 122 without increasing the thickness thereof. The coupling portion 125 has a long tubular portion and a flange portion extending radially outward from one end (left end in FIG. 4 and FIG. 5) of the tubular portion, and is coaxially and rotatably supported by the input shaft 20i via a bushing or a radial bearing, for example. The tubular portion (the other end thereof) of the coupling portion 125 is coupled to the first and the second sun gears 21s and 22s via splines, for example, and the flange portion of the coupling portion 125 is firmly fixed to the inner peripheral portion of the drum portion 122 by welding, for example. Consequently, the drum portion 122 is continuously coupled to the first and the second sun gears 21s and 22s via the coupling portion 125.

As shown in FIG. 4 and FIG. 5, the open-side end of the drum portion 122 is press-fitted into the flange portion 121b (opening) of the hub portion 121, and the outer peripheral surface of the open-side end of the drum portion 122 and the inner peripheral surface of the flange portion 121b are firmly fixed by welding. Consequently, the hub portion 121 is continuously coupled to the first and the second sun gears 21s and 22s via the drum portion 122 and the coupling portion 125. The hub portion 121 and the cylindrical portion of the drum portion 122 constitute a tubular portion having splines on both of the outer peripheral side and the inner peripheral side thereof. The flange portion 121b thus fixed to the outer periphery of the open-side end of the drum portion 122 functions as an annular rib. The inner peripheral surface of the hub body 121a of the hub portion 121 faces the outer peripheral surface of the drum portion 122 with a gap interposed therebetween that depends on the radial dimension of the flange portion 121b. Between the hub body 121a of the hub portion 121 and the drum portion 122, an annular space 121c (oil pocket) is defined that is open on the side opposite to the open-side end of the drum portion 122 and the flange portion 121b.

The drum member 130 has a drum portion (tubular portion) 131 used by the clutch C1, a hub portion 133 used by the clutch C3, and an annular support portion 135. In the present embodiment, the drum portion 131, the hub portion 133, and the support portion 135 are integrally formed by casting an aluminum alloy, for example. The drum portion 131 has a cylindrical portion including an open-side end (left end in FIG. 4 and FIG. 5) that is continuously coupled (fixed) to the third ring gear 23r of the Ravigneaux type planetary gear mechanism 25 as the element to be connected by the clutches C1 and C3, and an annular sidewall portion extending radially inward from one end (right end in FIG. 4 and FIG. 5) of the cylindrical portion. On the inner peripheral surface of the drum portion 131 (cylindrical portion), splines are formed, and the outer peripheral surface of the drum portion 131 (cylindrical portion) is formed in a shape of a cylindrical surface without protrusions or indentations. This can secure the strength of the drum portion 131 without increasing the thickness thereof.

The hub portion 133 of the drum member 130 extends from the annular sidewall portion of the drum portion 131 toward the side (right side in FIG. 4 and FIG. 5) opposite to the open-side end of the drum portion 131 (cylindrical portion). In the present embodiment, the hub portion 133 is formed in a cylindrical shape having an outer diameter smaller than that of the drum portion 131. On the outer peripheral surface of the hub portion 133, splines are formed, and the inner peripheral surface of the hub portion 133 is formed in a shape of a recessed cylindrical surface without protrusions or indentations. This can secure the strength of the hub portion 133 without increasing the thickness thereof. In the present embodiment, the support portion 135 extends radially inward from the inner peripheral surface of the hub portion 133, and the inner peripheral portion thereof is coaxially and rotatably supported by (the outer peripheral surface of) the coupling portion 125 of the drum member 120 via a bush or a radial bearing, for example.

The drum member 360 (clutch constituent member) has a drum portion (tubular portion) 361 that is formed in a shape of a bottomed cylinder one end of which (left end in FIG. 4 and FIG. 5) is open, and a coupling portion 365 that is continuously coupled (fixed) to a ring gear flange (coupling member) 220 that rotates together with the second ring gear 22r of the second planetary gear 22 as the element to be connected (element to be held stationary) by the clutch C3 and the brake B2. The drum portion 361 of the drum member 360 has a cylindrical portion and an annular sidewall portion extending radially inward from one end (right end in FIG. 4 and FIG. 5) of the cylindrical portion. On the inner peripheral surface and the outer peripheral surface of the drum portion 361 (cylindrical portion), splines are formed. To the inner peripheral portion of the drum portion 361 (annular sidewall portion), the outer peripheral portion of the coupling portion 365 is firmly fixed by welding, for example.

The coupling portion 365 of the drum member 360 is radially supported (aligned) by an annular center support (intermediate support portion) 11c made of aluminum alloy, for example, that is fixed to the transmission case 11 so as to be positioned between the drum portion 361 (Ravigneaux type planetary gear mechanism 25) and the second planetary gear 22 and constitutes a part of the transmission case 11 (stationary member). As shown in the drawing, the center support 11c extends radially inward from the inner peripheral surface of the transmission case 11, and has an inner tubular portion 115 having a center hole. Into the inner peripheral surface of the inner tubular portion 115, an iron sleeve 117 is press-fitted (fixed). The coupling portion 365 has a tubular portion 366 (see FIG. 6) extending in the axial direction of the automatic transmission 20 (the input shaft 20i and the output shaft 20o). The tubular portion 366 is inserted into the sleeve 117 fixed to the inner tubular portion 115 of the center support 11c and is coupled to the second ring gear 22r. Furthermore, between the sleeve 117 and the tubular portion 366 of the drum member 360, a bushing (bearing) 118 is disposed, with which the drum member 360 (the outer peripheral surface of the tubular portion 366) is rotatably supported by the center support 11c.

A distal end portion 367 of the tubular portion 366 of the coupling portion 365 is formed so as to have an outer diameter smaller than that of an area surrounded by the inner peripheral surface of the inner tubular portion 115 of the center support 11c. On the inner peripheral surface of the distal end portion 367, splines are formed so as to overlap the bushing 118 in the axial direction when viewed from the radial direction. Furthermore, the ring gear flange 220 has an inner peripheral portion 221 that is fitted (spline-fitted) into the splines of the distal end portion 367 of the coupling portion 365 and an outer peripheral portion 222 that is fitted (spline-fitted) into splines formed on the inner peripheral surface of the second ring gear 22r. Consequently, the drum member 360 (drum portion 361) is continuously coupled to the second ring gear 22r via two fitting portions (spline fitting portions) provided on the inner peripheral side and the outer peripheral side of the ring gear flange 220.

In the present embodiment, at least either one of the fitting portion between the inner peripheral portion 221 of the ring gear flange 220 and the distal end portion 367 of the drum member 360 and the fitting portion between the outer peripheral portion 222 of the ring gear flange 220 and the second ring gear 22r is structured as a fitting portion without an aligning function. This fitting portion without an aligning function has radial play (gap, i.e., clearance between each bottom land of the splines of the inner peripheral portion 221 or the outer peripheral portion 222 and the corresponding top land of the splines of the distal end portion 367 or the second ring gear 22r) that is larger than a backlash between adjacent spline teeth in the circumferential direction. As described above, the distal end portion 367 of the tubular portion 366 of the drum member 360 has an outer diameter smaller than that of an area supported by the inner peripheral surface of the center support 11c. Thus, the distal end portion 367 of the coupling portion 365 is fitted into the inner peripheral portion 221 of the ring gear flange 220 at an inner position (position closer to the intermediate shaft 20m) than a position in which the coupling portion 365 (tubular portion 366) is supported by the center support 11c.

The clutch C1 including the drum members 120 and 130 as constituent members includes: a plurality of friction plates (friction engagement plates) 101; a plurality of separator plates (friction engagement plates) 102 arranged alternately with the friction plates 101, and a backing plate; a piston 140 that presses the friction plates 101 and the separator plates 102 to cause these plates to frictionally engage with each other; a plurality of return springs (coil springs) SP1 that bias the piston 140 such that the piston 140 is separated apart from the friction plates 101 and the separators plates 102; and an annular cancel plate (cancel oil-chamber defining member) 170, in addition to the drum members 120 and 130.

The friction plates 101 (the respective inner peripheral portions thereof) of the clutch C1 are fitted into splines formed on the outer peripheral surface of the hub portion 121 of the drum member 120, i.e., the hub body 121a, that is disposed to be surrounded by the drum portion 131 of the drum member 130. Accordingly, the friction plates 101 are supported by the drum member 120 that functions as a clutch hub so as to rotate together with the hub portion 121 and be axially movable. The separator plates 102 (the respective outer peripheral portions) of the clutch C1 are fitted into splines formed on the inner peripheral surface of the drum portion 131 of the drum member 130. Accordingly, the separator plates 102 are supported by the drum member 130 that functions as a clutch drum so as to rotate together with the drum portion 131 and be axially movable.

The piston 140 is disposed between the drum portion 131 of the drum member 130 and the drum portion 122 of the drum member 120, and is supported by the support portion 135 of the drum member 130 so as to rotate together with the drum member 130 and be axially movable. The cancel plate 170 is disposed between the piston 140 and the drum portion 122 of the drum member 120, i.e., on the opposite side of the piston 140 from the support portion 135 of the drum member 130, and is fixed to the support portion 135 with a snap ring. The piston 140, together with the support portion 135 of the drum member 130, defines an engagement oil chamber (first engagement oil chamber) 150 of the clutch C1. Furthermore, the cancel plate 170, together with the piston 140 and the support portion 135, defines a centrifugal oil pressure cancel chamber (first centrifugal oil pressure cancel chamber) 190 for canceling centrifugal oil pressure generated in the engagement oil chamber 150.

Consequently, all oil chambers of the clutch C1, i.e., the engagement oil chamber 150 and the centrifugal oil pressure cancel chamber 190 are defined by the drum member 130 (support portion 135), the piston 140, and the cancel plate 170 that rotate together with the third ring gear 23r (first output element) of the Ravigneaux type planetary gear mechanism 25. In the present embodiment, as shown in FIG. 4 and FIG. 5, the engagement oil chamber 150 and the centrifugal oil pressure cancel chamber 190 of the clutch C1 are defined so as to be separated further apart from the Ravigneaux type planetary gear mechanism 25 and be positioned closer to the second planetary gear 22 than the hub portion 121 and the drum portion 122 of the drum member 120 are.

To the engagement oil chamber 150 of the clutch C1, engagement oil pressure (hydraulic oil) to the clutch C1, the pressure of which is adjusted by the hydraulic control apparatus, is supplied through oil passages formed in the input shaft 20i, the coupling portion 125 of the drum member 120, and the support portion 135 of the drum member 130, for example. To the centrifugal oil pressure cancel chamber 190, hydraulic oil (e.g., drain oil for lubrication and cooling) from the hydraulic control apparatus is supplied through oil passages formed in the input shaft 20i, the coupling portion 125 of the drum member 120, and the support portion 135 of the drum member 130, for example. The return springs SP1 are arranged at intervals in the circumferential direction inside the centrifugal oil pressure cancel chamber 190 so as to be positioned between the piston 140 and the cancel plate 170. As the return springs SP1 of the clutch C1, a single leaf spring may be used instead of the coil springs.

The clutch C2 including the drum member 120 as a constituent member includes: a clutch hub 200; a plurality of friction plates (first friction engagement plates) 201; a plurality of separator plates 202 (second friction engagement plates) and a backing plate; a piston 240 that presses the friction plates 201 and the separator plates 202 to cause these plates to frictionally engage with each other; an annular oil-chamber defining member 270; and a plurality of return springs (coil springs) SP2 that bias the piston 240 such that the piston 240 is separated apart from the friction plates 201 and the separator plates 202, in addition to the drum member 120.

The clutch hub 200 includes: a shaft portion 230 that extends in the axial direction from the third sun gear 23s of the Ravigneaux type planetary gear mechanism 25; an annular wall portion 231 that extends radially outward from the shaft portion 230 on the side closer to the third sun gear 23s in the axial direction than to an end surface (contact end surface) 230s of the shaft portion 230 that is positioned on the side opposite to the third sun gear 23s; and a tubular portion 232 that extends (from the left side to the right side in the drawing) in the axial direction from the wall portion 231 such that the shaft portion 230 is surrounded. In the present embodiment, the shaft portion 230 is formed integrally with the third sun gear 23s, and the wall portion 231 and the tubular portion 232 are integrally formed. The wall portion 231 extends radially inward from the inner peripheral surface of the tubular portion 232, and is continuously coupled (fixed) to the shaft portion 230 via splines on the side closer to the third sun gear 23s in the axial direction than to the end surface (contact end surface) 230s.

As shown in the drawing, the shaft portion 230 of the clutch hub 200 is coaxially and rotatably supported by the input shaft 20i via a radial bearing. Between the input shaft 20i (third carrier 23c) continuously coupled to the third carrier 23c of the Ravigneaux type planetary gear mechanism 25 and the shaft portion 230 of the clutch hub 200, a thrust bearing T3 is disposed. Furthermore, between the end surface 230s on the side opposite to the third sun gear 23s of the shaft portion 230 of the clutch hub 200 and the coupling portion 125 (flange portion) of the drum member 120, a thrust bearing T4 is disposed so that the end surface 230s is in contact with a race. Between the coupling portion 125 (flange portion) of the drum member 120 and the support portion 135 of the drum member 130, a thrust bearing T5 is disposed. Specifically, the drum member 120 is disposed such that the coupling portion 125 extends through between the drum member 130 that functions as a clutch drum of the clutch C1 and the clutch hub 200 of the clutch C2 and toward the first and the second sun gears 21s and 22s that are elements to be connected. Between the support portion 135 of the drum member 130 and the coupling portion 365 of the drum member 360, a thrust bearing T6 is disposed.

The friction plates 201 (the respective outer peripheral portions) of the clutch C2 are fitted into splines formed on an inner peripheral surface of the drum portion 122 of the drum member 120 that is disposed to surround the clutch hub 200. Accordingly, the friction plates 201 are supported by the drum member 120 that functions as a clutch drum so as to rotate together with the drum portion 122 and be axially movable. The separator plates 202 (the respective inner peripheral portions) of the clutch C2 are fitted into the splines formed on the outer peripheral surface of the tubular portion 232 of the clutch hub 200. Accordingly, the separator plates 202 are supported by the clutch hub 200 so as to rotate together with the clutch hub 200 and be axially movable.

The piston 240 is disposed so that the piston 240 is surrounded by the drum portion 122 of the drum member 120 and a part of the piston 240 on the inner peripheral side protrudes inside the tubular portion 232 of the clutch hub 200. The piston 240 is supported by the shaft portion 230 so as to rotate together with the shaft portion 230 that is a component of the clutch hub 200 and be axially movable. Furthermore, the oil-chamber defining member 270 is fixed to the shaft portion 230 with a snap ring so as to be positioned between the piston 240 and the drum member 120, i.e., on the opposite side of the piston 240 (the inner peripheral portion thereof) from the coupling portion of the clutch hub 200 and the third sun gear 23s. The piston 240, together with the oil-chamber defining member 270 and the shaft portion 230, defines an engagement oil chamber (second engagement oil chamber) 250 of the clutch C2. Furthermore, the piston 240, together with the clutch hub 200 and the shaft portion 230, defines a centrifugal oil pressure cancel chamber (second centrifugal oil pressure cancel chamber) 290 for canceling centrifugal oil pressure generated in the engagement oil chamber 250.

Consequently, all oil chambers of the clutch C2, i.e., the engagement oil chamber 250 and the centrifugal oil pressure cancel chamber 290 are defined by the shaft portion 230 of the clutch hub 200, the piston 240, and the oil-chamber defining member 270 that rotate together with the third sun gear 23s (second output element) of the Ravigneaux type planetary gear mechanism 25. In the present embodiment, as shown in FIG. 4 and FIG. 5, the engagement oil chamber 250 and the centrifugal oil pressure cancel chamber 290 of the clutch C2 are defined so as to be positioned closer to the Ravigneaux type planetary gear mechanism 25 than the cancel plate 170 of the clutch C1, i.e., the engagement oil chamber 150 and the centrifugal oil pressure cancel chamber 190 of the clutch C1 are. Furthermore, the engagement oil chamber 250 and the centrifugal oil pressure cancel chamber 290 are separated further apart from the second planetary gear 22 and are positioned closer to the input shaft 20i.

To the engagement oil chamber 250 of the clutch C2, engagement oil pressure (hydraulic oil) to the clutch C2, which is adjusted by the hydraulic control apparatus, is supplied through oil passages formed in the input shaft 20i and the shaft portion 230 that is a component of the clutch hub 200, for example. To the centrifugal oil pressure cancel chamber 290, hydraulic oil (e.g., drain oil for lubrication and cooling) from the hydraulic control apparatus is supplied through oil passages formed in the input shaft 20i and the shaft portion 230 that is a component of the clutch hub 200, for example. The return springs SP2 are arranged at intervals in the circumferential direction inside the centrifugal oil pressure cancel chamber 290 so as to be positioned between the piston 240 and the clutch hub 200 (coupling portion). As the return springs SP2 of the clutch C2, a single leaf spring may be used instead of the coil springs.

The clutch C3 including the drum members 130 and 360 as constituent members includes: a plurality of friction plates 301; a plurality of separator plates 302 arranged alternately with the friction plates 301, and a backing plate; a piston 340 that presses the friction plates 301 and the separator plates 302 to cause these plates to frictionally engage with each other; a plurality of return springs (coil springs) SP3 that bias the piston 340 such that the piston 340 is separated apart from the friction plates 301 and the separator plates 302; and an annular cancel plate (cancel oil-chamber defining member) 370, in addition to the drum members 130 and 360.

The friction plates 301 (the respective inner peripheral portions thereof) of the clutch C3 are fitted into the splines formed on the outer peripheral surface of the hub portion 133 of the drum member 130 extending toward the second planetary gear 22 side, i.e., rearward in the vehicle. Accordingly, the friction plates 301 are supported by the drum member 130 that functions as a clutch hub so as to rotate together with the hub portion 133 and be axially movable. The separator plates 302 (the respective outer peripheral portions thereof) of the clutch C3 are fitted into the splines (inner peripheral portions) formed on the inner peripheral surface of the drum portion 361 of the drum member 360 that is disposed to surround the hub portion 133 of the drum member 130. Accordingly, the separator plates 302 are supported by the drum member 360 that functions as a clutch drum so as to rotate together with the drum portion 361 and be axially movable.

The piston 340 is disposed between the drum member 130 and the drum portion 361 of the drum member 360, and is supported by the coupling portion 365 of the drum member 360 so as to rotate together with the drum member 360 and be axially movable. The cancel plate 370 is disposed between the piston 340 and the drum member 130, i.e., on the opposite side of the piston 340 from the coupling portion 365 of the drum member 360, and is fixed to the coupling portion 365 with a snap ring. The piston 340 together with the drum member 360 defines an engagement oil chamber (third engagement oil chamber) 350 of the clutch C3. Furthermore, the cancel plate 370 together with the piston 340 defines a centrifugal oil pressure cancel chamber (third centrifugal oil pressure cancel chamber) 390 for canceling centrifugal oil pressure generated in the engagement oil chamber 350.

Consequently, all oil chambers of the clutch C3, i.e., the engagement oil chamber 350 and the centrifugal oil pressure cancel chamber 390 are defined by the drum member 360, the piston 340, and the cancel plate 370 that rotate together with the second ring gear 22r of the second planetary gear 22. In the present embodiment, as shown in FIG. 5, the engagement oil chamber 350 and the centrifugal oil pressure cancel chamber 390 of the clutch C3 are defined so as to be separated further apart from the Ravigneaux type planetary gear mechanism 25 and be positioned closer to the second planetary gear 22 than the support portion 135 of the drum member 130, i.e., the engagement oil chamber 150 and the centrifugal oil pressure cancel chamber 190 of the clutch C1 are.

To the engagement oil chamber 350 of the clutch C3, engagement oil pressure (hydraulic oil) to the clutch C3, which is adjusted by the hydraulic control apparatus, is supplied through an oil passage 116 formed in the center support 11c and an oil passage 368 formed in the coupling portion 365 of the drum member 360, for example. As shown in FIG. 5 and FIG. 6, on both sides of a communicating portion between the oil passage 116 of the center support 11c and the oil passage 368 of the drum member 360 in the axial direction, seal members SR such as seal rings that seal clearance between the sleeve 117 fixed to the center support 11c and the tubular portion 366 of the drum member 360 are each disposed. In this manner, the iron sleeve 117 is fixed to the inside of the inner tubular portion 115 of the center support 11c made of aluminum alloy, whereby wear of the inner tubular portion 115 due to sliding of the seal members SR attached to the tubular portion 366 can be suppressed. Into the centrifugal oil pressure cancel chamber 390, hydraulic oil (e.g., drain oil for lubrication and cooling) from the hydraulic control apparatus supplied to the thrust bearing T6 through oil passages formed in the intermediate shaft 20m and the coupling portion 125 of the drum member 120, for example, flows through an oil hole formed in the coupling portion 365 of the drum member 360. The return springs SP3 are arranged at intervals in the circumferential direction inside the centrifugal oil pressure cancel chamber 390 so as to be positioned between the piston 340 and the cancel plate 370. As the return springs SP3 of the clutch C3, a single leaf spring may be used instead of the coil springs.

As shown in FIG. 6, the brake B2 including the drum member 360 as a constituent member includes: a plurality of friction plates (friction engagement plates) 601; a plurality of separator plates (friction engagement plates) 602 arranged alternately with the friction plates 601, and a backing plate; a first piston 641 that presses the friction plates 601 and the separator plates 602 to cause these plates to frictionally engage with each other; a second piston 642 that can press the first piston 641; and a plurality of return springs (coil springs) SP6 that bias the first piston 641 so that the first piston 641 is separated apart from the friction plates 601 and the separator plates 602.

The friction plates 601 (the respective inner peripheral portions) of the brake B2 are fitted into the splines (outer peripheral portions) formed on the outer peripheral surface of the drum portion 361 of the drum member 360. The respective friction plates 601 are supported by the drum member 360 that functions as a brake hub so as to rotate together with the drum portion 361 and be axially movable. The separator plates 602 (the respective outer peripheral portions) of the brake B2 are fitted into splines formed on an inner peripheral surface of the transmission case 11. The respective separator plates 602 are supported by the transmission case 11 so as to be stationary with respect to the transmission case 11 and be axially movable. As shown in FIG. 4 and FIG. 6, the friction plates 601 and the separator plates 602 of the brake B2 are disposed on the opposite side of the center support 11c from the second planetary gear 22, i.e., on the side closer to the Ravigneaux type planetary gear mechanism 25 than the center support 11c is.

As shown in FIG. 5 and FIG. 6, on the center support 11c, an annular first recess 111 that is open toward the side opposite to the second planetary gear 22, i.e., the Ravigneaux type planetary gear mechanism 25 side (left in the drawing) and an annular second recess 112 that is open toward the side opposite to the second planetary gear 22 in the same manner are formed. The first recess 111 is formed radially inward of the second recess 112, and is surrounded by the second recess 112. The first and second recesses 111 and 112 are separated by an annular partition 113 (see FIG. 6) so as not to communicate with each other, and are formed so as to have substantially the same axial length in the present embodiment.

The first piston 641 has an annular first pressure-receiving portion 641a and a plate-pressing portion 641b that presses the first and the second friction engagement plates. The first pressure-receiving portion 641a is movably fitted into the first recess 111. Between the inner peripheral surface of the first pressure-receiving portion 641a and the inside inner surface of the first recess 111 and between the outer peripheral surface of the first pressure-receiving portion 641a and the outside inner surface of the first recess 111, seal members such as O-rings are disposed one by one. Accordingly, the first pressure-receiving portion 641a is supported by the center support 11c so as to be axially movable, and together with the center support 11c defines a first engagement oil chamber 651 of the brake B1. The plate-pressing portion 641b extends radially outward from the first pressure-receiving portion 641a. The plate-pressing portion 641b is fitted into splines on the transmission case 11, thereby protruding toward the Ravigneaux type planetary gear mechanism 25 (toward the side opposite to the second planetary gear 22) so as to be capable of coming into contact with the separator plate 602 that is positioned closest to the second planetary gear 22.

The second piston 642 has a second pressure-receiving portion 642a and a piston-pressing portion 642b. The second pressure-receiving portion 642a is movably fitted into the second recess 112. Between the inner peripheral surface of the second pressure-receiving portion 642a and the inside inner surface of the second recess 112 and between the outer peripheral surface of the second pressure-receiving portion 642a and the outside inner surface of the second recess 112, seal members such as O-rings are disposed one by one. Accordingly, the second pressure-receiving portion 642a is supported by the center support 11c so as to be axially movable, and together with the center support 11c defines a second engagement oil chamber 652 of the brake B1. The piston-pressing portion 642b extends from the second pressure-receiving portion 642a toward the Ravigneaux type planetary gear mechanism 25 (toward the side opposite to the second planetary gear 22) so as to be capable of coming into contact with the back surface of the plate-pressing portion 641b of the first piston 641.

To the first and the second engagement oil chambers 651 and 652 of the brake B2, engagement oil pressure (hydraulic oil), which is adjusted by the hydraulic control apparatus, is supplied independently through oil passages formed in the center support 11c. The return springs SP6 are arranged at intervals in the circumferential direction between an annular spring support member 670 and the first piston 641, and is opposed to the first engagement oil chamber 651. The spring support member 670 is fixed to the center support 11c with a snap ring so as to be positioned on the opposite side of the first piston 641 from the first engagement oil chamber 651.

As the return springs SP6 of the brake B2, a single leaf spring may be used instead of the coil springs.

Between the second carrier 22c of the second planetary gear 22 and the inner peripheral portion 221 of the ring gear flange 220 coupled to the drum member 360 that is shared by the clutch C3 and the brake B2 as described above, a thrust bearing T7 is disposed as shown in FIG. 6. Between the second carrier 22c of the second planetary gear 22 and the second sun gear 22s (and a gear shaft portion 212 of the first sun gear 21s), a thrust bearing T8 is disposed as shown in FIG. 6. Furthermore, between the gear shaft portion 212 of the first sun gear 21s (and the second sun gear 22s) and the intermediate shaft 20m, a thrust bearing T9 is disposed as shown in FIG. 6.

As shown in FIG. 4 and FIG. 6, the clutch C4 is disposed closest to the output shaft 20o among the four clutches C1 to C4 and the two brakes B1 and B2. Specifically, the clutch C4 is disposed on the opposite side of the second planetary gear 22 from the Ravigneaux type planetary gear mechanism 25, i.e., posteriorly to the first planetary gear 21 in the vehicle (right side in FIG. 1). As shown in FIG. 6, the clutch C4 includes: a clutch hub 400; a clutch drum 410; a plurality of friction plates 401; a plurality of separator plates 402 arranged alternately with the friction plates 401, and a backing plate; a piston 440 that presses the friction plates 401 and the separator plates 402 to cause these plates to frictionally engage with each other; a plurality of return springs (coil springs) SP4 that bias the piston 440 such that the piston 440 is separated apart from the friction plates 401 and the separator plates 402; and an annular cancel plate (cancel oil-chamber defining member) 470.

The clutch hub 400 is rotatably supported by the intermediate shaft 20m via bushing or a radial bearing. As shown in FIG. 6, between the intermediate shaft 20m and the clutch hub 400, a thrust bearing T10 is disposed, and between the clutch hub 400 and the output shaft 20o, a thrust bearing T11 is disposed. Furthermore, the clutch hub 400 is continuously coupled (fixed) to the first ring gear 21r of the first planetary gear 21 via splines and a snap ring. The clutch drum 410 includes: an annular sidewall portion 411 that is fixed to an increased-diameter portion formed on the output shaft 20o by welding, for example; and a cylindrical portion 412 that is formed in a shape of a bottomed cylinder one end of which (left end in FIG. 6) is open, and is joined to the outer peripheral portion of the annular sidewall portion 411 by welding, for example, and that extends along the axial direction of the output shaft 20o, for example. The open-side end (left end in FIG. 6) of the cylindrical portion 412 is continuously coupled (fixed) to the second carrier 22c of the second planetary gear 22 via splines, for example.

The friction plates 401 (the respective inner peripheral portions) of the clutch C4 are fitted into splines formed on an outer peripheral surface of the clutch hub 400. Accordingly, the friction plates 401 are supported by the clutch hub 400 so as to rotate together with the clutch hub 400 and be axially movable. The separator plates 402 (the respective outer peripheral portions) of the clutch C4 are fitted into splines formed on an inner peripheral surface of the cylindrical portion 412 of the clutch drum 410. Accordingly, the separator plates 402 are supported by the clutch drum 410 so as to rotate together with the clutch drum 410 and be axially movable.

The piston 440 is disposed, inside the cylindrical portion 412 of the clutch drum 410, on the side closer to the first planetary gear 21 (more anteriorly in the vehicle) than the annular sidewall portion 411 is, and is supported by the output shaft 20o so as to rotate together with the output shaft 20o and be axially movable. The cancel plate 470 is fixed to the output shaft 20o with a snap ring so as to be positioned on the side closer to the first planetary gear 21 (more anteriorly in the vehicle) than the piston 440 is. The piston 440, together with the clutch drum 410 and the output shaft 20o as oil-chamber defining portions, defines an engagement oil chamber (first engagement oil chamber) 450 of the clutch C4. Furthermore, the cancel plate 470, together with the piston 440 and the output shaft 20o, defines a centrifugal oil pressure cancel chamber (fourth centrifugal oil pressure cancel chamber) 490 for canceling centrifugal oil pressure generated in the engagement oil chamber 450. Consequently, all oil chambers of the clutch C4, i.e., the engagement oil chamber 450 and the centrifugal oil pressure cancel chamber 490 are defined by the clutch drum 410, the piston 440, and the cancel plate 470 that rotate together with the second carrier 22c of the second planetary gear 22 and the output shaft 20o.

To the engagement oil chamber 450 of the clutch C4, engagement oil pressure (hydraulic oil) to the clutch C4, which is adjusted by the hydraulic control apparatus, is supplied through oil passages formed in the transmission case 11 and the output shaft 20o, for example. To the centrifugal oil pressure cancel chamber 490, hydraulic oil (e.g., drain oil for lubrication and cooling) from the hydraulic control apparatus is supplied through oil passages formed in the transmission case 11 and the output shaft 20o, for example. The return springs SP4 are arranged at intervals in the circumferential direction inside the centrifugal oil pressure cancel chamber 490 so as to be positioned between the piston 440 and the cancel plate 470. As the return springs SP4 of the clutch C4, a single leaf spring may be used instead of the coil springs. The output shaft 20o is rotatably supported by the transmission case 11 via a bushing and a radial bearing. Between the output shaft 20o and the transmission case 11, a thrust bearing T12 is disposed as shown in FIG. 6.

As described above, the automatic transmission 20 includes: the Ravigneaux type planetary gear mechanism 25 including the third sun gear 23s, the third ring gear 23r, and the third carrier 23c that rotatably supports the third pinion gear 23p and the fourth pinion gear 24p and to which power is transmitted from the input shaft 20i; the clutch C1 (first clutch) that interconnects the third ring gear 23r that is the first output element with the first and the second sun gears 21s and 22s (elements to be connected) of the first and the second planetary gears 21 and 22 that are disposed to be separated apart from the Ravigneaux type planetary gear mechanism 25 in the axial direction, and releases this interconnection; the clutch C2 (second clutch) that interconnects the third sun gear 23s that is the second output element of the Ravigneaux type planetary gear mechanism 25 with the first and the second sun gears 21s and 22s (elements to be connected), and releases this interconnection; and the drum member 120 that is shared by the clutches C1 and C2.

The drum member 120 has: the tubular portion constituted by the hub portion 121 having an outer peripheral portion onto which the friction plates 101 (first friction engagement plates) of the clutch C1 are fitted and the drum portion 122 having an inner peripheral portion into which the friction plates 201 (second friction engagement plates) of the clutch C2 are fitted; and the coupling portion 125 that extends from the drum portion 122 as a component of this tubular portion and is coupled to the first and the second sun gears 21s and 22s. The drum member 120 is disposed such that the coupling portion 125 extends through between the drum member 130 that functions as a clutch drum of the clutch C1 and the clutch hub 200 of the clutch C2 and toward the first and the second sun gears 21s and 22s that are elements to be connected. Furthermore, between the end surface 230s of the shaft portion 230 of the clutch hub 200 and the coupling portion 125 (flange portion) of the drum member 120, the thrust bearing T4 is disposed. Between the coupling portion 125 (flange portion) of the drum member 120 and the support portion 135 of the drum member 130, the thrust bearing T5 is disposed. Furthermore, in the automatic transmission 20, the thrust bearings T1, T2, and T3 are disposed between the clutch hub 200 and the front support 11f that constitutes a part of the transmission case 11 accommodating the Ravigneaux type planetary gear mechanism 25, for example, and the thrust bearings T6 to T12 are disposed between the support portion 135 of the drum member 130 and (a rear portion of) the transmission case 11.

In the automatic transmission 20, as gears that constitute the Ravigneaux type planetary gear mechanism 25 and the first and the second planetary gears 21 and 22, helical gears are used. Thus, in the Ravigneaux type planetary gear mechanism 25, thrust forces in the opposite directions act on the third ring gear 23r on the outer circumferential side and the third sun gear 23s on the center side. Thus, the drum member 130 as a clutch drum of the clutch C1 that is coupled to the third ring gear 23r and the clutch hub 200 that is disposed inside the drum portion 131 of the drum member 130 and is coupled to the third sun gear 23s tend to move in mutually opposite directions. In view of this, in the automatic transmission 20, directions of tooth traces of the third sun gear 23s, the fourth sun gear 24s, the third ring gear 23r, the third pinion gear 23p, and the fourth pinion gear 24p of the Ravigneaux type planetary gear mechanism 25 are determined such that, when power is transmitted from the input shaft 20i to the Ravigneaux type planetary gear mechanism 25 and the vehicle travels forward, the third sun gear 23s is biased toward the first and the second sun gears 21s and 22s that are elements to be connected (posteriorly in the vehicle), and the third ring gear 23r is biased toward the side opposite to the first and the second sun gears 21s and 22s (anteriorly in the vehicle) (see FIG. 4).

Accordingly, when power is transmitted from the input shaft 20i to the Ravigneaux type planetary gear mechanism 25 and the vehicle travels forward, even if the drum member 130 of the clutch C1 that rotates together with the third ring gear 23r and the clutch hub 200 of the clutch C2 that rotates together with the third sun gear 23s tend to move in the mutually opposite directions, by the thrust bearings T4 and T5 inside the drum portion 131 of the drum member 130, i.e., the thrust bearing T4 disposed between the clutch hub 200 and the coupling portion 125 of the drum member 120 and the thrust bearing T5 disposed between the coupling portion 125 and the support portion 135 of the drum member 130, the drum member 130 of the clutch C1 and the clutch hub 200 of the clutch C2 can be supported in the axial direction.

Consequently, loads on the thrust bearings T1, T2, and T3 that are disposed between the transmission case 11 (front support 11f) accommodating the Ravigneaux type planetary gear mechanism 25 and the clutch hub 200 and on the thrust bearings T6 to T12 that are disposed between the drum member 130 and the transmission case 11 can be satisfactorily reduced. Thus, in the automatic transmission 20, the thrust bearings T1 to T3 and T6 to T12 in particular can be downsized, whereby the increase in size of the entire apparatus can be suppressed. Furthermore, in the automatic transmission 20, the drum member 120 is used as a clutch hub of the clutch C1 and a clutch drum of the clutch C2, whereby the increase in the number of components and size of the entire apparatus can be satisfactorily suppressed. In the embodiment described above, angles, for example, of tooth traces of the third sun gear 23s, the fourth sun gear 24s, the third ring gear 23r, the third pinion gear 23p, and the fourth pinion gear 24p of the Ravigneaux type planetary gear mechanism 25 are determined such that thrust forces acting on the third and the fourth sun gears 23s and 24s and thrust forces acting on the third ring gear 23r are canceled with each other when power is transmitted from the input shaft 20i to the third carrier 23c and both of the double-pinion type planetary gear (third planetary gear) and the single-pinion type planetary gear (fourth planetary gear) that are components of the Ravigneaux type planetary gear mechanism 25 transmit torque.

In the automatic transmission 20, the clutch hub 200 of the clutch C2 includes: the shaft portion 230 extending in the axial direction from the third sun gear 23s of the Ravigneaux type planetary gear mechanism 25 and having the end surface 230s that is in contact with the thrust bearing T4 on the side opposite to the third sun gear 23s; the annular wall portion 231 that extends radially outward from the shaft portion 230 on the side closer to the third sun gear 23s than to the end surface 230s in the axial direction; and the tubular portion 232 that extends from the wall portion 231 in the axial direction such that the shaft portion 230 is surrounded and has an outer peripheral portion onto which the separator plates 202 of the clutch C2 are fitted. In the clutch hub 200 thus structured, an end portion of the shaft portion 230 on the end surface 230s side does not contribute to transmission of torque when the clutch C2 is engaged. Thus, structuring the clutch hub 200 such that compressive loads due to thrust force are received eliminates the need to increase the torsional rigidity of the end portion on the end surface 230s side. This can reduce the size and the weight of the clutch hub 200 of the clutch C2.

Furthermore, in the Ravigneaux type planetary gear mechanism 25 including the third sun gear 23s, the third ring gear 23r, and the third and the fourth pinion gears 23p and 24p that are structured with helical gears, on the third and the fourth pinion gears 23p and 24p, thrust forces do not substantially act (are canceled). Thus, by continuously coupling the input shaft 20i to the third carrier 23c that supports the third and the fourth pinion gears 23p and 24p, the axial movement of the input shaft 20i during operation of the automatic transmission 20 can be suppressed. This can further reduce loads on the thrust bearings T1 to T12 included in the automatic transmission 20, and thus the entire apparatus can be made more compact.

As described above, the automatic transmission 20 includes: the annular center support 11c that extends radially inward from the inner peripheral surface of the transmission case 11; the Ravigneaux type planetary gear mechanism (first planetary gear mechanism) 25 to which power is transmitted from the input shaft 20i; the second planetary gear 22 (second planetary gear mechanism) that is disposed on the opposite side of the center support 11c from the Ravigneaux type planetary gear mechanism 25; the clutch C3 that interconnects the third ring gear 23r (any one of the rotating elements) of the Ravigneaux type planetary gear mechanism 25 with the second ring gear 22r (element to be connected) of the second planetary gear 22, and releases this interconnection; and the brake B2 that connects the second ring gear 22r to the transmission case 11 to hold the second ring gear 22r stationary, and releases this connection.

Furthermore, in the automatic transmission 20, when the vehicle travels forward, the rotation speed of the third ring gear 23r of the Ravigneaux type planetary gear mechanism 25 is equal to or higher than the rotation speed of the input shaft 20i, and the rotation speed of the second planetary gear 22 corresponding to the clutch C3 and the brake B2 is equal to or lower than the rotation speed of the third ring gear 23r. Specifically, when the vehicle travels forward, the rotation speed of the third ring gear 23r is equal to the rotation speed of the input shaft 20i when the first forward speed and the seventh forward speed are formed, and is about 1.5 times as high as the rotation speed of the input shaft 20i when shift speeds of the second forward speed to the sixth forward speed and the eighth forward speed to the tenth forward speed are formed. When the vehicle travels forward, the rotation speed of the second ring gear 22r is a value of zero when shift speeds of the first forward speed to the fourth forward speed are formed by engagement of the brake B2, is equal to the rotation speed of the third ring gear 23r when shift speeds of the seventh forward speed to the tenth forward speed are formed by engagement of the clutch C3, and is about 0.3 to 0.7 times as high as the rotation speed of the input shaft 20i when shift speeds of the fifth forward speed and the sixth forward speed are formed.

The engagement oil chamber 350 of the clutch C3 is defined by the drum member 360 (clutch constituent member) and the piston 340 supported by the drum member 360, in which the drum member 360 rotates together, not with the third ring gear 23r of the Ravigneaux type planetary gear mechanism 25, but with the second ring gear 22r of the second planetary gear 22. To the engagement oil chamber 350 of the clutch C3, hydraulic oil is supplied through the oil passage 116 formed in the center support 11c of the transmission case 11 and the oil passage 368 formed in the drum member 360. Furthermore, on both sides of the communicating portion between the oil passage 116 of the center support 11c and the oil passage 368 of the drum member 360 in the axial direction, the seal members SR are disposed that seal clearances between the sleeve 117 fixed to the center support 11c and the clutch drum 410.

In this manner, to the engagement oil chamber 350 of the clutch C3 that is structured to detour around the center support 11c of the transmission case 11, hydraulic oil is supplied through, for example, the oil passages 116 and 368 formed in the center support 11c and the drum member 360 defining the engagement oil chamber 350, whereby engagement oil pressure can be supplied to the clutch C3 without making the oil passage structure complicated. Furthermore, the engagement oil chamber 350 of the clutch C3 is defined by the drum member 360 and the piston 340 supported by the drum member 360, in which the drum member 360 is coupled, not to the third ring gear 23r of the Ravigneaux type planetary gear mechanism 25 that always rotates at a rotation speed equal to or higher than the rotation speed of the input shaft 20i when the vehicle travels forward, but to the second ring gear 22r of the second planetary gear 22 that is connected to the transmission case 11 by the brake B2 to stop rotating under some conditions and rotates at a rotation speed equal to or lower than the rotation speed of third ring gear 23r when the vehicle travels forward. This can satisfactorily reduce drag loss due to frictional resistance of the seal members SR disposed between the center support 11c (sleeve 117) and the drum member 360. Thus, in the automatic transmission 20, oil supply performance of the clutch C3 can be further improved, and drag loss in the clutch C3 can be satisfactorily reduced.

In the automatic transmission 20, the drum member 360 is aligned with respect to the transmission case 11 by the inner peripheral surface of the center support 11c, i.e., by the inner peripheral surface of the sleeve 117 that is fixed (press-fitted) into the inner tubular portion 115. This can suppress the increase in size and variation of the clearance between the inner peripheral surface of the sleeve 117 (center support 11c) and the tubular portion 366 of the drum member 360. Thus, uneven wear, for example, of the seal members SR can be satisfactorily suppressed to reduce drag loss, and leakage of hydraulic oil from the communicating portion between the oil passage 116 of the center support 11c and the oil passage 368 of the drum member 360 can be reliably restricted by the seal members SR on both sides.

Furthermore, the drum member 360 has the drum portion (tubular portion) 361 having an inner peripheral portion into which the separator plates 302 (friction engagement plates) of the clutch C3 are fitted and having an outer peripheral portion onto which the friction plates 601 (friction engagement plates) of the brake B2 are fitted. Accordingly, the brake B2 can be disposed so as to surround the clutch C3, and thus the increase in the axial length of the automatic transmission 20 can be suppressed. Furthermore, the drum member 360 is shared by the clutch C3 and the brake B2, whereby the increase in the number of components can be suppressed, and the entire apparatus can be made compact.

In the automatic transmission 20, when the brake B2 is engaged, i.e., when low speeds of the first forward speed to the fourth forward speed are formed, the drum member 360, the piston 340, and the cancel plate 370 (the engagement oil chamber 350 and the centrifugal oil pressure cancel chamber 390), for example, do not rotate, and thus the increase in rotational inertia when the low speeds are formed can be suppressed, and accelerating performance of the vehicle can be improved. Furthermore, when rotation of rotating elements of the automatic transmission 20 suddenly changes in sudden acceleration, for example, of the vehicle with the low speeds being formed, the movement of the piston 340 by centrifugal oil pressure and the engagement of the clutch C3 can be satisfactorily suppressed. Furthermore, in the automatic transmission 20, because the drum member 360 rotates when the fifth forward speed and the sixth forward speed are formed, hydraulic oil can be sufficiently stored in the centrifugal oil pressure cancel chamber 390 during this period of time. Accordingly, when shift speeds of the seventh forward speed to the tenth forward speed are formed, centrifugal oil pressure generated in the engagement oil chamber 350 can be satisfactorily canceled to satisfactorily stabilize controllability of the clutch C3.

Furthermore, the second planetary gear 22 of the automatic transmission 20 includes: the second ring gear 22r that is an element to be connected by the clutch C3 and is an element to be held stationary by the brake B2; the second carrier 22c that is an output element continuously coupled to the output shaft 20o; and the second sun gear 22s that is an element to be connected (second elements to be connected) by the clutches C1 and C2. When the fourth sun gear 24s that is a fixable element is held stationary by the brake B1, the Ravigneaux type planetary gear mechanism 25 of the automatic transmission 20 increases the speed of power transmitted to the third carrier 23c so that the rotation speed of the third ring gear 23r that is the first output element is lower than the rotation speed of the third sun gear 23s that is the second output element, and transmits the power to the third ring gear 23r and the third sun gear 23s. In other words, when the vehicle travels forward while the fourth sun gear 24s is held stationary by the brake B1, the third ring gear 23r and the third sun gear 23s of the Ravigneaux type planetary gear mechanism 25 rotate at a rotation speed higher than that of the third carrier 23c. Thus, when the brake B2 is engaged, shift speeds of the first forward speed to the fourth forward speed can be formed, and when the clutch C3 is engaged and the brake B2 is disengaged, shift speeds of the seventh forward speed to the tenth forward speed can be formed in which speed ratios are lower than that of the fourth forward speed.

In the automatic transmission 20, instead of the Ravigneaux type planetary gear mechanism 25, a compound planetary gear train such as a Simpson type (SS-CR type) or a CR-CR type including two single-pinion type planetary gears may be used. The structures related to tooth traces of the gear of the Ravigneaux type planetary gear mechanism 25 and the clutches C1 and C2 and the structure related to the engagement oil chamber 350 of the clutch C3 may be applied to a transmission in which the Ravigneaux type planetary gear mechanism 25 is replaced with a single type or a double-pinion type planetary gear, and to a transmission in which the second planetary gear 22 is replaced with a compound planetary gear train. Furthermore, in the automatic transmission 20, the brake B2 does not have to be disposed so as to surround the clutch C3. In this case, the clutch C3 may include a clutch constituent member that functions only as a clutch drum or a clutch hub instead of the drum member 360.

In the automatic transmission 20, at least one of the clutches C1 to C4 and the brakes B1 and B2 may be an intermeshing engagement element such as a dog clutch or a dog brake. For example, in the automatic transmission 20, as the brake B2 that is continuously engaged when the first forward speed to the fourth forward speed are each formed and that is engaged when the reverse speed is formed, a dog brake may be used. Furthermore, in the automatic transmission 20, the gear ratios $\lambda 1$ to $\lambda 4$ in the first and the second planetary gears 21 and 22 and the Ravigneaux type planetary gear mechanism 25 are not limited to those exemplified in the above description. The automatic transmission 20 described above may be modified into a transmission mounted on a front-wheel-drive vehicle.

As described above, a multi-stage transmission of the present disclosure is a multi-stage transmission that changes speed of power transmitted from a motor of a vehicle to an input member to transmit the power to an output member. The multi-stage transmission includes: a case including an annular support portion that extends radially inward from an inner peripheral surface of the case; a first planetary gear mechanism that includes a plurality of rotating elements and to which power is transmitted from the input member; a second planetary gear mechanism that is disposed on an opposite side of the support portion of the case from the first planetary gear mechanism; a clutch that interconnects any one of the rotating elements of the first planetary gear mechanism with an element to be connected which is included in the second planetary gear mechanism and releases this interconnection; and a brake that connects the element to be connected to the case to hold this element stationary and releases this connection. In the multi-stage transmission, rotation speed of any one of the rotating elements is equal to or higher than rotation speed of the input member when the vehicle travels forward, an engagement oil chamber of the clutch is defined by a clutch constituent member that rotates together with the element to be connected and a piston that is supported by the clutch constituent member, the clutch constituent member is rotatably supported by an inner peripheral surface of the support portion via a bearing, hydraulic oil is supplied to the engagement oil chamber from an oil passage formed in the support portion of the case, and a seal member for blocking the hydraulic oil is disposed between the support portion and the clutch constituent member.

The multi-stage transmission of the present disclosure includes: the case including the annular support portion that extends radially inward from the inner peripheral surface of the case; the first planetary gear mechanism to which power is transmitted from the input member; the second planetary gear mechanism that is disposed on the opposite side of the support portion from the first planetary gear mechanism; the clutch that interconnects any one of the rotating elements of the first planetary gear mechanism with the element to be connected which is included in the second planetary gear mechanism and releases this interconnection; and the brake that connects the element to be connected to the case to hold this element stationary and releases this connection. In the multi-stage transmission of the present disclosure, the rotation speed of any one of the rotating elements is equal to or higher than the rotation speed of the input member when the vehicle travels forward, the engagement oil chamber of the clutch is defined by the clutch constituent member that rotates together with the element to be connected and the piston that is supported by the clutch constituent member. The clutch constituent member is rotatably supported by the inner peripheral surface of the support portion via the bearing. Furthermore, hydraulic oil is supplied to the engagement oil chamber of the clutch through oil passages formed in the support portion of the case and the clutch constituent member, and seal members for sealing clearance between the support portion and the clutch constituent member are disposed on both sides of a communicating portion between the oil passage of the support portion and the oil passage of the clutch constituent member in the axial direction.

In this manner, to the engagement oil chamber of the clutch that is structured to detour around the support portion of the case, hydraulic oil is supplied from the oil passage formed in the support portion, whereby engagement oil pressure can be supplied to the clutch without making the oil passage structure complicated. Furthermore, the engagement oil chamber of the clutch is defined by the clutch constituent member and the piston supported by the clutch constituent member, in which the clutch constituent member rotates together, not with any one of the rotating elements that rotates at a rotation speed equal to or higher than the rotation speed of the input member when the vehicle travels forward, but with the element to be connected that is connected to the case by the brake to stop rotating under some conditions. This can satisfactorily reduce drag loss due to frictional resistance of the seal member disposed between the support portion and the clutch constituent member. Thus, in the multi-stage transmission of the present disclosure, oil supply performance of the clutch can be further improved, and drag loss in the clutch can be satisfactorily reduced. Furthermore, the clutch constituent member is rotatably supported by the inner peripheral surface of the support portion via the bearing, whereby the increase in size and variation of the clearance between the inner peripheral surface of the support portion and the clutch constituent member can be suppressed. Thus, uneven wear, for example, of the seal members can be satisfactorily suppressed to reduce drag loss, and leakage of hydraulic oil from the communicating portion between the oil passage of the support portion and the oil passage of the clutch constituent member can be reliably restricted by the seal members on both sides.

The clutch constituent member may have a coupling portion having an outer peripheral surface that is rotatably supported by the inner peripheral surface of the support portion via the bearing and having an inner peripheral surface that has a spline into which the element to be connected is spline-fitted, and the splines of the clutch constituent member may overlap the bearing when viewed from an axial direction.

Furthermore, the clutch constituent member may be a drum member that has a tubular portion having an inner peripheral portion into which a friction engagement plate of the clutch is fitted and an outer peripheral portion onto which a friction engagement plate of the brake is fitted. This allows the brake to be disposed such that the clutch is surrounded, and thus the increase in the axial length of the multi-stage transmission can be suppressed. Furthermore, the drum member is shared by the clutch and the brake, whereby the increase in the number of components can be suppressed, and the entire apparatus can be made compact.

In the multi-stage transmission, a plurality of shift speeds may be formed by selectively engaging a plurality of engagement elements including the clutch and the brake, the brake may be engaged when shift speeds of a minimum shift speed to a predetermined shift speed are formed, and be disengaged when a shift speed is formed in which a speed ratio thereof is lower than that of the predetermined shift speed, and the clutch may be engaged when a shift speed is formed in which a speed ratio thereof is lower than that of the predetermined shift speed. In this multi-stage transmission, when the vehicle travels forward, the rotation speed of the element to be connected which is included in the second planetary gear mechanism can always be equal to or lower than the rotation speed of any one of the rotating elements of the first planetary gear mechanism. Thus, in this multi-stage transmission, oil supply performance of the clutch can be further improved, and drag loss in the clutch can be more satisfactorily reduced. Furthermore, in this multi-stage transmission, when the brake is engaged, i.e., when low speeds of the minimum shift speed to the predetermined shift speed are formed, the clutch constituent member and the piston (and the engagement oil chamber) do not rotate, and thus the increase in rotational inertia when the low speeds are formed can be suppressed, and accelerating performance of the vehicle can be improved, and also when rotation of rotating elements of the multi-stage transmission suddenly changes in sudden acceleration, for example, of the vehicle with the low speeds being formed, it is possible to suppress the movement of the piston by centrifugal oil pressure and the engagement of the clutch.

Furthermore, the multi-stage transmission may further include a first clutch, a second clutch, a third clutch that is the clutch, a first brake, and a second brake that is the brake. The first planetary gear mechanism may be a compound planetary gear train including an input element that is continuously coupled to the input member, a fixable element, a first output element that is any one of the rotating elements, and a second output element. The second planetary gear mechanism may be a planetary gear including the element to be connected, an output element that is continuously coupled to the output member, and a second element to be connected. The first clutch may interconnect the first output element of the first planetary gear mechanism with the second element to be connected of the second planetary gear mechanism, and may also release this interconnection. The second clutch may connect the second output element of the first planetary gear mechanism to the second element to be connected, and may also release this connection. The first brake may connect the fixable element of the first planetary gear mechanism to the case to hold this fixable element stationary, and may also release this connection. When the fixable element is held stationary by the first brake, the first planetary gear mechanism may increase speed of power transmitted to the input element such that rotation speed of the first output element is lower than rotation speed of the second output element, and transmit the power to the first and the second output elements. With this configuration, when the brake (second brake) is engaged, shift speeds of the minimum shift speed to the predetermined shift speed can be formed, and when the clutch (third clutch) is engaged and the brake (second brake) is disengaged, shift speeds can be formed in which speed ratios are lower than that of the predetermined shift speed. Herein, the planetary gear mechanism may be a single planetary gear, and the second planetary gear mechanism may be a compound planetary gear train.

The multi-stage transmission may further include: a first planetary gear including a first rotating element, a second rotating element, and a third rotating element that are aligned in order at intervals corresponding to a gear ratio on a speed diagram; a second planetary gear that is the second planetary gear mechanism including a fourth rotating element, a fifth rotating element, and a sixth rotating element that are aligned in order at intervals corresponding to a gear ratio on a speed diagram; and a fourth clutch. The element to be connected may be the sixth rotating element of the second planetary gear. The second element to be connected may include the first rotating element of the first planetary gear and the fourth rotating element of the second planetary gear that are continuously coupled together. The input element of the planetary gear mechanism and the second rotating element of the first planetary gear may be continuously coupled to the input member. The fifth rotating element of the second planetary gear and the output member may be continuously coupled together. The fourth clutch may interconnect the third rotating element of the first planetary gear with the fifth rotating element of the second planetary gear and the output member that are continuously coupled together, and may also release this interconnection.

The multi-stage transmission according to the embodiment includes the planetary gear mechanism that is the compound planetary gear train, the first and the second planetary gears, the first to the fourth clutches, and the first and the second brakes. In this multi-stage transmission, by selectively engaging any three out of the first to the fourth clutches and the first and the second brakes, forward speeds from the first speed to the tenth speed and a reverse speed can be formed. Consequently, in this multi-stage transmission, the spread (gear ratio width=gear ratio of minimum shift speed/gear ratio of maximum shift speed) can be increased to improve power transfer efficiency, i.e., fuel efficiency and acceleration performance of the vehicle, and the step ratio (gear ratio of a certain shift speed/gear ratio of a shift speed that is one speed higher than this certain shift speed) can be optimized (suppressed further increase) to improve shift feeling. Thus, this multi-stage transmission can satisfactorily improve both power transfer efficiency and drivability. Furthermore, in this multi-stage transmission, in the same manner as in the case of the input element of the Ravigneaux type planetary gear mechanism, the second rotating element of the first planetary gear is continuously coupled to the input member, and the third rotating element of the first planetary gear is selectively connected to the output member (and the fifth rotating element of the second planetary gear) by the fourth clutch. This can reduce the torque share of the fourth clutch in comparison with, for example, a clutch of a transmission in which a third rotating element of a first planetary gear together with a fifth rotating element of a second planetary gear is continuously coupled to an output member, and a second rotating element of the first planetary gear is selectively connected to an input member, and the clutch selectively connects the second rotating element to the input member. Consequently, the fourth clutch can be made compact at least in either one of the axial direction and the radial direction. Thus, with this multi-stage transmission, both power transfer efficiency and drivability can be improved, and also the increase in size of the entire apparatus can be suppressed.

In the multi-stage transmission, by engaging the first to the fourth clutches and the first and the second brakes as described below, the forward speeds from the first speed to the tenth speed and the reverse speed can be formed. Specifically, the first forward speed is formed by engaging the first clutch, the second clutch, and the second brake. The second forward speed is formed by engaging the first clutch, the first brake, and the second brake. Furthermore, the third forward speed is formed by engaging the second clutch, the first brake, and the second brake. The fourth forward speed is formed by engaging the fourth clutch, the first brake, and the second brake. Furthermore, the fifth forward speed is formed by engaging the second clutch, the fourth clutch, and the first brake. The sixth forward speed is formed by engaging the first clutch, the fourth clutch, and the first brake. Furthermore, the seventh forward speed is formed by engaging the first clutch, the third clutch, and the fourth clutch. The eighth forward speed is formed by engaging the third clutch, the fourth clutch, and the first brake. Furthermore, the ninth forward speed is formed by engaging the first clutch, the third clutch, and the first brake. Furthermore, the tenth forward speed is formed by engaging the second clutch, the third clutch, and the first brake. The reverse speed is formed by engaging the second clutch, the third clutch, and the second brake.

In this multi-stage transmission, by engaging any three engagement elements and disengaging the remaining three engagement elements out of six engagement elements, i.e., the first to the fourth clutches and the first and the second brakes, the first forward speed to the tenth forward speed and the reverse speed are formed. This can reduce the number of engagement elements that are disengaged when each shift speed is formed in comparison with a transmission that, for example, engages two engagement elements and disengages the remaining four engagement elements out of six engagement elements to form a plurality of shift speeds. Consequently, drag loss in the engagement elements that are disengaged when each shift speed is formed can be reduced, whereby the power transfer efficiency of the multi-stage transmission can be further improved.

Furthermore, the output member may be an output shaft coupled to rear wheels of the vehicle via a differential gear. In other words, the multi-stage transmission of the present disclosure may be structured as a transmission mounted on a rear-wheel-drive vehicle. Note that the multi-stage transmission of the present disclosure can be structured as a transmission mounted on a front-wheel-drive vehicle as already described above.

The disclosure of the present disclosure is not limited to the embodiment described above and, needless to say, various changes may be made without departing from the scope of the present disclosure. Furthermore, the embodiment described above is merely one specific mode of the disclosure described only in the Summary of the Disclosure section, and does not limit the elements of the disclosure described in the Summary of the Disclosure section.

INDUSTRIAL APPLICABILITY

The disclosure of the present disclosure is applicable to the manufacturing industry, for example, of multi-stage transmissions.

The invention claimed is:

1. A multi-stage transmission that changes speed of power transmitted from a motor of a vehicle to an input member to transmit the power to an output member, the multi-stage transmission comprising:
a case including an annular support that extends radially inward from an inner peripheral surface of the case;
a first planetary gear mechanism that includes a plurality of rotating elements and to which power is transmitted from the input member;
a second planetary gear mechanism that is disposed on an opposite side of the support of the case from the first planetary gear mechanism;
a clutch that interconnects one of the rotating elements of the first planetary gear mechanism with an element to be connected which is included in the second planetary gear mechanism and releases this interconnection; and
a brake that connects the element to be connected to the case to hold this element stationary and releases this connection, wherein
rotation speed of the one of the rotating elements is equal to or higher than rotation speed of the input member when the vehicle travels forward,
an engagement oil chamber of the clutch is defined by a clutch constituent member that rotates together with the element to be connected and a piston that is supported by the clutch constituent member, the clutch constituent member is rotatably supported by an inner peripheral surface of the support via a bearing, hydraulic oil is supplied to the engagement oil chamber from an oil passage formed in the support of the case, and a seal member for blocking the hydraulic oil is disposed between the support and the clutch constituent member,
the clutch constituent member has a coupling having an outer peripheral surface that is rotatably supported by the inner peripheral surface of the support via the bearing and having an inner peripheral surface that has a spline into which the element to be connected is spline-fitted, and
the spline of the clutch constituent member overlaps the bearing in an axial direction when viewed from a radial direction.

2. The multi-stage transmission according to claim 1, wherein
the clutch constituent member is a drum member that has a tubular portion having an inner peripheral portion into which a friction engagement plate of the clutch is fitted and an outer peripheral portion onto which a friction engagement plate of the brake is fitted.

3. The multi-stage transmission according to claim 2, wherein
a plurality of shift speeds are formed by selectively engaging a plurality of engagement elements including the clutch and the brake,
the brake is engaged when shift speeds of a minimum shift speed to a predetermined shift speed are formed, and is disengaged when a shift speed is formed in which a speed ratio of the shift speed is lower than that of the predetermined shift speed, and
the clutch is engaged when a shift speed is formed in which a speed ratio of the shift speed is lower than that of the predetermined shift speed.

4. The multi-stage transmission according to claim 3, further comprising:
a first clutch;
a second clutch;
a third clutch that is the clutch;
a first brake; and
a second brake that is the brake, wherein
the first planetary gear mechanism is a compound planetary gear train including an input element that is continuously coupled to the input member, a fixable element, a first output element that is the one of the rotating elements, and a second output element,
the second planetary gear mechanism is a planetary gear including the element to be connected, an output element that is continuously coupled to the output member, and a second element to be connected,
the first clutch interconnects the first output element of the first planetary gear mechanism with the second element to be connected of the second planetary gear mechanism and releases this interconnection,
the second clutch connects the second output element of the first planetary gear mechanism to the second element to be connected and releases this connection,
the first brake connects the fixable element of the first planetary gear mechanism to the case to hold this fixable element stationary and releases this connection, and
when the fixable element is held stationary by the first brake, the first planetary gear mechanism increases speed of power transmitted to the input element such that rotation speed of the first output element is lower than rotation speed of the second output element, and transmits the power to the first and the second output elements.

5. The multi-stage transmission according to claim 4, further comprising:
a first planetary gear including a first rotating element, a second rotating element, and a third rotating element;
a second planetary gear that is the second planetary gear mechanism including a fourth rotating element, a fifth rotating element, and a sixth rotating element; and
a fourth clutch, wherein
the element to be connected is the sixth rotating element of the second planetary gear,
the second element to be connected is the first rotating element of the first planetary gear and the fourth rotating element of the second planetary gear that are continuously coupled together,
the input element of the first planetary gear mechanism and the second rotating element of the first planetary gear are continuously coupled to the input member,
the fifth rotating element of the second planetary gear and the output member are continuously coupled together, and
the fourth clutch interconnects the third rotating element of the first planetary gear with the fifth rotating element of the second planetary gear and the output member that are continuously coupled together and releases this interconnection.

6. The multi-stage transmission according to claim 5, wherein a first forward speed is formed by engaging the first clutch, the second clutch, and the second brake, a second forward speed is formed by engaging the first clutch, the first brake, and the second brake, a third forward speed is formed by engaging the second clutch, the first brake, and the second brake, a fourth forward speed is formed by engaging the fourth clutch, the first brake, and the second brake, a fifth forward speed is formed by engaging the second clutch, the fourth clutch, and the first brake, a sixth forward speed is formed by engaging the first clutch, the fourth clutch, and the first brake, a seventh forward speed is formed by engaging the first clutch, the third clutch, and the fourth clutch, an eighth forward speed is formed by engaging the third clutch, the fourth clutch, and the first brake, a ninth forward speed is formed by engaging the first clutch, the third clutch, and the first brake, a tenth forward speed is formed by engaging the second clutch, the third clutch, and the first brake, and a reverse speed is formed by engaging the second clutch, the third clutch, and the second brake.

7. The multi-stage transmission according to claim 6, wherein the output member is an output shaft.

8. A multi-stage transmission that changes speed of power transmitted from a motor of a vehicle to an input member to transmit the power to an output member, the multi-stage transmission comprising:

a case including an annular support that extends radially inward from an inner peripheral surface of the case;

a first planetary gear mechanism that includes a plurality of rotating elements and to which power is transmitted from the input member;

a second planetary gear mechanism that is disposed on an opposite side of the support of the case from the first planetary gear mechanism;

a clutch that interconnects one of the rotating elements of the first planetary gear mechanism with an element to be connected which is included in the second planetary gear mechanism and releases this interconnection; and a brake that connects the element to be connected to the case to hold this element stationary and releases this connection, wherein rotation speed of the one of the rotating elements is equal to or higher than rotation speed of the input member when the vehicle travels forward, an engagement oil chamber of the clutch is defined by a clutch constituent member that rotates together with the element to be connected and a piston that is supported by the clutch constituent member, the clutch constituent member is rotatably supported by an inner peripheral surface of the support via a bearing, hydraulic oil is supplied to the engagement oil chamber from an oil passage formed in the support of the case, and a seal member for blocking the hydraulic oil is disposed between the support and the clutch constituent member, and the clutch constituent member is a drum member that has a tubular portion having an inner peripheral portion into which a friction engagement plate of the clutch is fitted and an outer peripheral portion onto which a friction engagement plate of the brake is fitted.

9. The multi-stage transmission according to claim 8, wherein a plurality of shift speeds are formed by selectively engaging a plurality of engagement elements including the clutch and the brake, the brake is engaged when shift speeds of a minimum shift speed to a predetermined shift speed are formed, and is disengaged when a shift speed is formed in which a speed ratio of the shift speed is lower than that of the predetermined shift speed, and the clutch is engaged when a shift speed is formed in which a speed ratio of the shift speed is lower than that of the predetermined shift speed.

10. The multi-stage transmission according to claim 9, further comprising:

a first clutch;

a second clutch;

a third clutch that is the clutch;

a first brake; and a second brake that is the brake, wherein the first planetary gear mechanism is a compound planetary gear train including an input element that is continuously coupled to the input member, a fixable element, a first output element that is the one of the rotating elements, and a second output element, the second planetary gear mechanism is a planetary gear including the element to be connected, an output element that is continuously coupled to the output member, and a second element to be connected, the first clutch interconnects the first output element of the first planetary gear mechanism with the second element to be connected of the second planetary gear mechanism and releases this interconnection, the second clutch connects the second output element of the first planetary gear mechanism to the second element to be connected and releases this connection, the first brake connects the fixable element of the first planetary gear mechanism to the case to hold this fixable element stationary and releases this connection, and when the fixable element is held stationary by the first brake, the first planetary gear mechanism increases speed of power transmitted to the input element such that rotation speed of the first output element is lower than rotation speed of the second output element, and transmits the power to the first and the second output elements.

11. The multi-stage transmission according to claim 10, further comprising:

a first planetary gear including a first rotating element, a second rotating element, and a third rotating element;

a second planetary gear that is the second planetary gear mechanism including a fourth rotating element, a fifth rotating element, and a sixth rotating element; and a fourth clutch, wherein the element to be connected is the sixth rotating element of the second planetary gear, the second element to be connected is the first rotating element of the first planetary gear and the fourth rotating element of the second planetary gear that are continuously coupled together, the input element of the first planetary gear mechanism and the second rotating element of the first planetary gear are continuously coupled to the input member, the fifth rotating element of the second planetary gear and the output member are continuously coupled together, and the fourth clutch interconnects the third rotating element of the first planetary gear with the fifth rotating element of the second planetary gear and the output member that are continuously coupled together and releases this interconnection.

12. The multi-stage transmission according to claim 11, wherein a first forward speed is formed by engaging the first clutch, the second clutch, and the second brake, a second forward speed is formed by engaging the first clutch, the first brake, and the second brake, a third forward speed is formed by engaging the second clutch, the first brake, and the second brake, a fourth forward speed is formed by engaging the fourth clutch, the first brake, and the second brake, a fifth forward speed is formed by engaging the second clutch, the fourth clutch, and the first brake, a sixth forward speed is formed by engaging the first clutch, the fourth clutch, and the first brake, a seventh forward speed is formed by engaging the first clutch, the third clutch, and the fourth clutch, an eighth forward speed is formed by engaging the third clutch, the fourth clutch, and the first brake, a ninth forward speed is formed by engaging the first clutch, the third clutch, and the first brake, a tenth forward speed is formed by engaging the second clutch, the third clutch, and the first brake, and a reverse speed is formed by engaging the second clutch, the third clutch, and the second brake.

13. The multi-stage transmission according to claim 12, wherein the output member is an output shaft.

14. A multi-stage transmission that changes speed of power transmitted from a motor of a vehicle to an input member to transmit the power to an output member, the multi-stage transmission comprising:

a case including an annular support that extends radially inward from an inner peripheral surface of the case;

a first planetary gear mechanism that includes a plurality of rotating elements and to which power is transmitted from the input member;

a second planetary gear mechanism that is disposed on an opposite side of the support of the case from the first planetary gear mechanism;

a clutch that interconnects one of the rotating elements of the first planetary gear mechanism with an element to be connected which is included in the second planetary gear mechanism and releases this interconnection; and a brake that connects the element to be connected to the case to hold this element stationary and releases this connection, wherein rotation speed of the one of the rotating elements is equal to or higher than rotation speed of the input member when the vehicle travels forward, an engagement oil chamber of the clutch is defined by a clutch constituent member that rotates together with the element to be connected and a piston that is supported by the clutch constituent member, the clutch constituent member is rotatably supported by an inner peripheral surface of the support via a bearing, hydraulic oil is supplied to the engagement oil chamber from an oil passage formed in the support of the case, and a seal member for blocking the hydraulic oil is disposed between the support and the clutch constituent member, a plurality of shift speeds are formed by selectively engaging a plurality of engagement elements including the clutch and the brake, the brake is engaged when shift speeds of a minimum shift speed to a predetermined shift speed are formed, and is disengaged when a shift speed is formed in which a speed ratio of the shift speed is lower than that of the predetermined shift speed, and the clutch is engaged when a shift speed is formed in which a speed ratio of the shift speed is lower than that of the predetermined shift speed, and is disengaged when shift speeds of the minimum shift speed to the predetermined shift speed are formed, and the clutch constituent member does not rotate when the brake is engaged.

15. The multi-stage transmission according to claim 14, further comprising:

a first clutch;

a second clutch;

a third clutch that is the clutch;

a first brake; and a second brake that is the brake, wherein the first planetary gear mechanism is a compound planetary gear train including an input element that is continuously coupled to the input member, a fixable element, a first output element that is the one of the rotating elements, and a second output element, the second planetary gear mechanism is a planetary gear including the element to be connected, an output element that is continuously coupled to the output member, and a second element to be connected, the first clutch interconnects the first output element of the first planetary gear mechanism with the second element to be connected of the second planetary gear mechanism and releases this interconnection, the second clutch connects the second output element of the first planetary gear mechanism to the second element to be connected and releases this connection, the first brake connects the fixable element of the first planetary gear mechanism to the case to hold this fixable element stationary and releases this connection, and when the fixable element is held stationary by the first brake, the first planetary gear mechanism increases speed of power transmitted to the input element such that rotation speed of the first output element is lower than rotation speed of the second output element, and transmits the power to the first and the second output elements.

16. The multi-stage transmission according to claim 15, further comprising:

a first planetary gear including a first rotating element, a second rotating element, and a third rotating element;

a second planetary gear that is the second planetary gear mechanism including a fourth rotating element, a fifth rotating element, and a sixth rotating element; and a fourth clutch, wherein the element to be connected is the sixth rotating element of the second planetary gear, the second element to be connected is the first rotating element of the first planetary gear and the fourth rotating element of the second planetary gear that are continuously coupled together, the input element of the first planetary gear mechanism and the second rotating element of the first planetary gear are continuously coupled to the input member, the fifth rotating element of the second planetary gear and the output member are continuously coupled together, and the fourth clutch interconnects the third rotating element of the first planetary gear with the fifth rotating element of the second planetary gear and the output member that are continuously coupled together and releases this interconnection.

17. The multi-stage transmission according to claim 16, wherein a first forward speed is formed by engaging the first clutch, the second clutch, and the second brake, a second forward speed is formed by engaging the first clutch, the first brake, and the second brake, a third forward speed is formed by engaging the second clutch, the first brake, and the second brake, a fourth forward speed is formed by engaging the fourth clutch, the first brake, and the second brake, a fifth forward speed is formed by engaging the second clutch, the fourth clutch, and the first brake, a sixth forward speed is formed by engaging the first clutch, the fourth clutch, and the first brake, a seventh forward speed is formed by engaging the first clutch, the third clutch, and the fourth clutch, an eighth forward speed is formed by engaging the third clutch, the fourth clutch, and the first brake, a ninth forward speed is formed by engaging the first clutch, the third clutch, and the first brake, a tenth forward speed is formed by engaging the second clutch, the third clutch, and the first brake, and a reverse speed is formed by engaging the second clutch, the third clutch, and the second brake.

* * * * *